(12) United States Patent
Bruno

(10) Patent No.: US 10,441,098 B2
(45) Date of Patent: Oct. 15, 2019

(54) APPARATUS FOR FACILITATING THE HANGING OF AN OBJECT ON A WALL

(71) Applicant: Dillon Bruno, Inglewood, CA (US)

(72) Inventor: Dillon Bruno, Inglewood, CA (US)

( * ) Notice: Subject to any disclaimer, the term of this patent is extended or adjusted under 35 U.S.C. 154(b) by 0 days.

(21) Appl. No.: 15/841,885

(22) Filed: Dec. 14, 2017

(65) Prior Publication Data

US 2018/0178364 A1    Jun. 28, 2018

Related U.S. Application Data

(63) Continuation-in-part of application No. 15/146,118, filed on May 4, 2016, now Pat. No. 10,047,903.

(60) Provisional application No. 62/438,571, filed on Dec. 23, 2016, provisional application No. 62/156,761, filed on May 4, 2015.

(51) Int. Cl.
 *A47G 1/20* (2006.01)
 *B25C 3/00* (2006.01)
 *B25H 7/02* (2006.01)

(52) U.S. Cl.
 CPC .............. *A47G 1/205* (2013.01); *B25C 3/008* (2013.01); *B25H 7/02* (2013.01)

(58) Field of Classification Search
 CPC ................................ A47G 1/205; B25C 3/008
 USPC ........ 248/466, 475.1, 476, 497, 489; 33/613
 See application file for complete search history.

(56) References Cited

U.S. PATENT DOCUMENTS

| | | |
|---|---|---|
| 983,798 A | 2/1911 | Angell |
| 1,109,507 A | 9/1914 | Bostock et al. |
| 1,460,294 A | 6/1923 | Wegner et al. |
| 1,575,582 A | 3/1926 | Joy et al. |
| 1,776,646 A | 9/1930 | Wilson et al. |
| 2,349,339 A | 5/1944 | Cloer et al. |
| 2,420,869 A | 5/1947 | Dell et al. |
| 2,652,082 A | 9/1953 | Zanelli et al. |
| 2,657,382 A | 11/1953 | Lueneburg et al. |
| 3,060,440 A | 10/1962 | Pfaff et al. |
| 3,147,484 A | 9/1964 | Nelson et al. |
| 3,360,229 A | 12/1967 | Beyer et al. |
| 3,516,165 A | 6/1970 | Pfeffer et al. |
| 3,530,591 A | 9/1970 | Moffitt et al. |
| 3,695,499 A | 10/1972 | Taylor et al. |
| 3,919,903 A | 11/1975 | McAlister |
| 4,029,135 A | 6/1977 | Searfoss, Jr. |
| 4,054,237 A | 10/1977 | Rietveld |
| 4,179,058 A | 12/1979 | Yost |
| 4,201,258 A | 5/1980 | Elmore et al. |
| 4,220,309 A | 9/1980 | Eisen et al. |
| 4,221,248 A | 9/1980 | Rix |
| 4,241,510 A | 12/1980 | Radecki |

(Continued)

*Primary Examiner* — Michael Safavi
(74) *Attorney, Agent, or Firm* — Joseph G. Swan, P.C.

(57) ABSTRACT

Provided is, among other things, an apparatus for facilitating the hanging of an object on a wall or other surface. The apparatus includes: a main body section having a front surface and an elongated first opening; an upper section connected to the main body section and having a protruding portion that protrudes away from the front surface; a lower section connected to the main body section and having a second opening for accepting, as well as a structure for holding, a hanging/attachment element; and a securing mechanism. The upper section is slidably attached to the main body section via the elongated first opening and thereby capable of moving vertically up and down said main body section, but can be temporarily fixed at a desired position along the main body section by using the securing mechanism.

18 Claims, 17 Drawing Sheets

(56) References Cited

U.S. PATENT DOCUMENTS

| | | |
|---|---|---|
| 4,382,337 A | 5/1983 | Bendick |
| 4,403,725 A | 9/1983 | Lawrence |
| 4,437,602 A | 3/1984 | Kaczmarek |
| 4,473,957 A | 10/1984 | Faulkner |
| 4,559,690 A | 12/1985 | Asmus |
| 4,597,554 A | 7/1986 | James |
| 4,631,985 A | 12/1986 | Roberts |
| 4,637,583 A | 1/1987 | Babitz |
| 4,676,424 A | 6/1987 | Meador et al. |
| 4,843,923 A | 7/1989 | Voss |
| 4,893,776 A | 1/1990 | Floyd |
| 4,926,718 A | 5/1990 | Cook |
| 5,103,574 A | 4/1992 | Levy |
| 5,109,611 A | 5/1992 | Houck |
| 5,129,154 A | 7/1992 | Aydelott |
| 5,375,488 A | 12/1994 | Baitner |
| 5,454,542 A | 10/1995 | Hart |
| 5,471,760 A | 12/1995 | Farris |
| 5,509,213 A | 4/1996 | Kelly et al. |
| 5,529,234 A | 6/1996 | Juneau |
| 5,605,313 A | 2/1997 | Erickson et al. |
| 6,032,378 A | 3/2000 | Null |
| 6,088,862 A | 7/2000 | Bulcock |
| 6,122,788 A | 9/2000 | Bulcock |
| 6,185,831 B1 | 2/2001 | Pluciennik |
| 6,352,009 B1 | 3/2002 | Gaidjiergis |
| 6,421,928 B1 | 7/2002 | Miller |
| 6,739,065 B2 | 5/2004 | Hofmeister et al. |
| 6,951,153 B2 | 10/2005 | Berthlaume |
| 6,952,887 B2 | 10/2005 | Rimback |
| 6,957,797 B1 | 10/2005 | Strobel |
| 6,971,184 B2 | 12/2005 | Prevost |
| 6,978,551 B2 | 12/2005 | Krake et al. |
| 7,013,516 B1 | 3/2006 | Peters |
| 7,028,413 B2 | 4/2006 | Filipescu |
| 7,056,322 B2 | 6/2006 | Davison et al. |
| 7,100,475 B1 | 9/2006 | Rufolo, Jr. |
| 7,159,329 B2 | 1/2007 | Dolenz et al. |
| 7,316,078 B2 | 1/2008 | Hagman |
| 7,566,042 B1 | 7/2009 | Yates |
| 7,628,304 B2 | 12/2009 | Yamamoto et al. |
| 7,665,705 B2 | 2/2010 | Wong |
| 7,779,730 B2 | 8/2010 | Jones |
| 7,797,853 B2 | 9/2010 | Compton |
| 7,802,769 B1 | 9/2010 | Lindsey |
| 7,814,675 B2 | 10/2010 | Venderley et al. |
| 7,832,702 B2 | 11/2010 | Yates |
| 7,963,193 B2 | 6/2011 | Morgan |
| 8,479,612 B2 | 7/2013 | Sergyeyenko et al. |
| 8,539,691 B2 | 9/2013 | Daniel |
| 2002/0078583 A1 | 6/2002 | Richardson |
| 2002/0170189 A1 | 11/2002 | Cheatham |
| 2002/0189119 A1 | 12/2002 | High |
| 2003/0229999 A1 | 12/2003 | Rimback |
| 2004/0035255 A1 | 2/2004 | Rion |
| 2004/0177527 A1 | 9/2004 | Prevost |
| 2005/0034318 A1 | 2/2005 | Filipescu |
| 2005/0166713 A1 | 8/2005 | Lloyd |
| 2006/0101948 A1 | 5/2006 | Meitzler et al. |
| 2006/0196069 A1 | 9/2006 | Groepper |
| 2006/0231721 A1 | 10/2006 | Robic |
| 2009/0261227 A1 | 10/2009 | Venderley et al. |
| 2009/0283650 A1 | 11/2009 | Yates |
| 2009/0313843 A1 | 12/2009 | Compton |
| 2010/0132514 A1 | 6/2010 | Morgan |
| 2010/0154598 A1 | 6/2010 | Sergyeyenko et al. |
| 2011/0174116 A1 | 7/2011 | Lin |
| 2015/0144756 A1 | 5/2015 | Miller |
| 2016/0128497 A1 | 5/2016 | Marks |

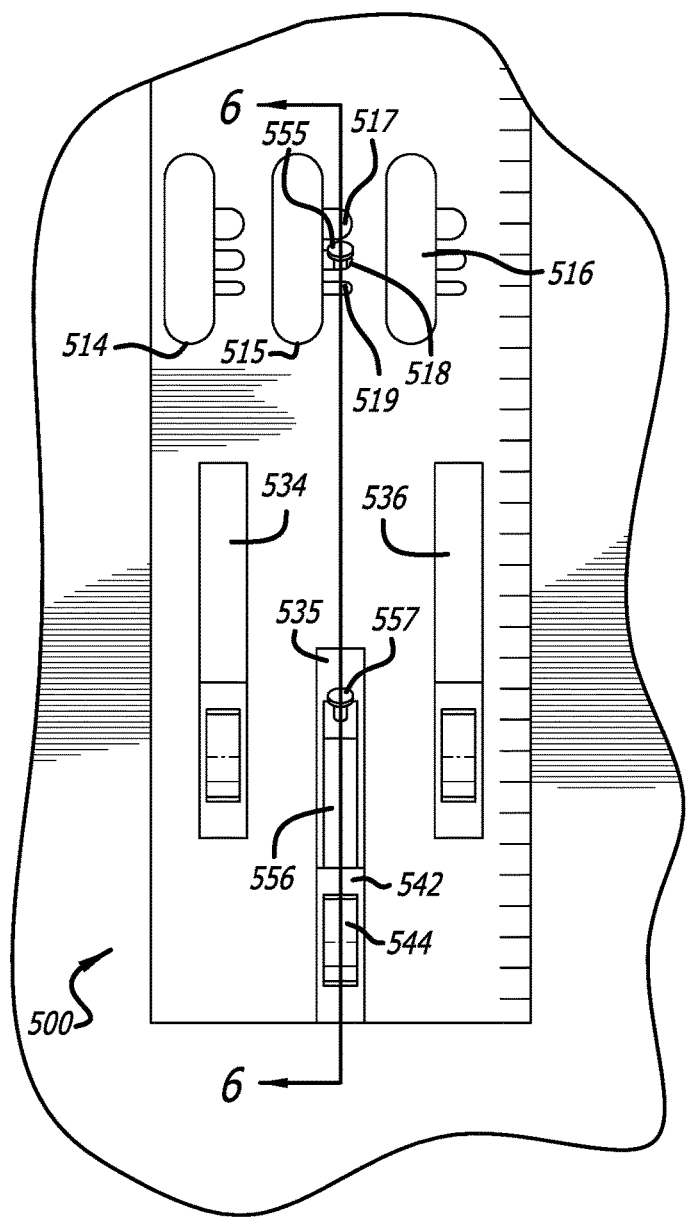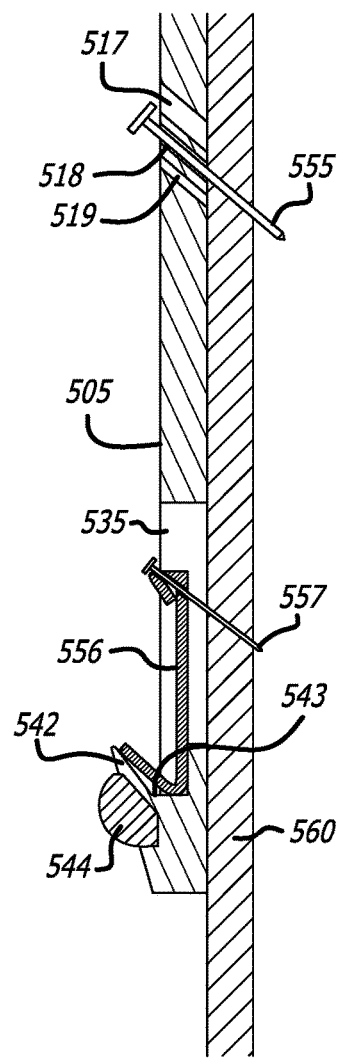
FIG. 5
FIG. 6

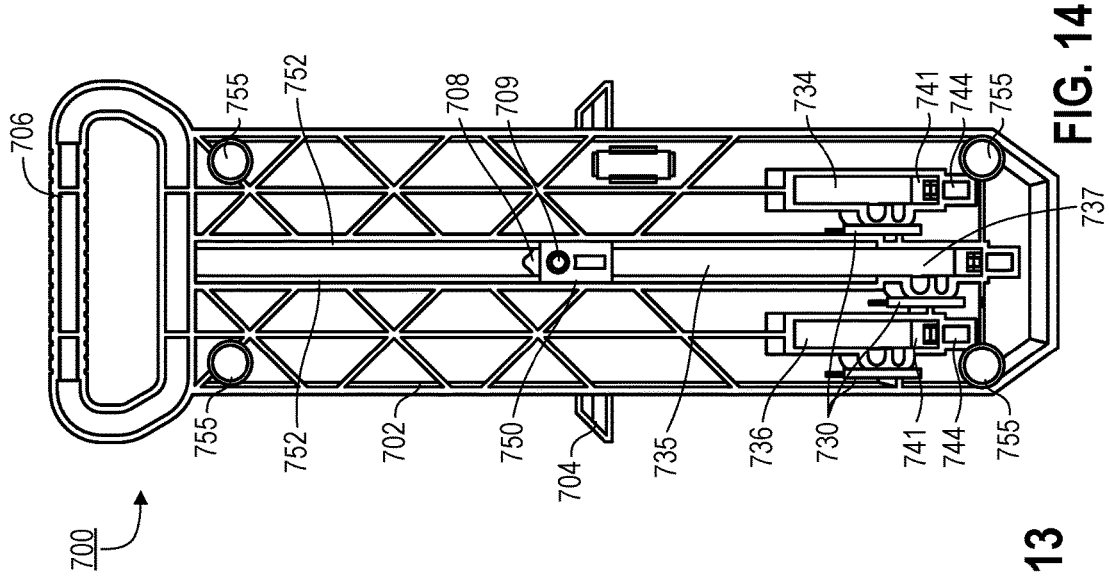
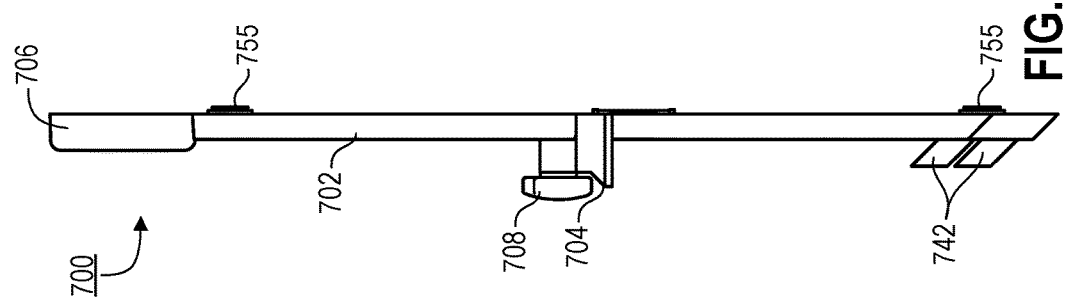
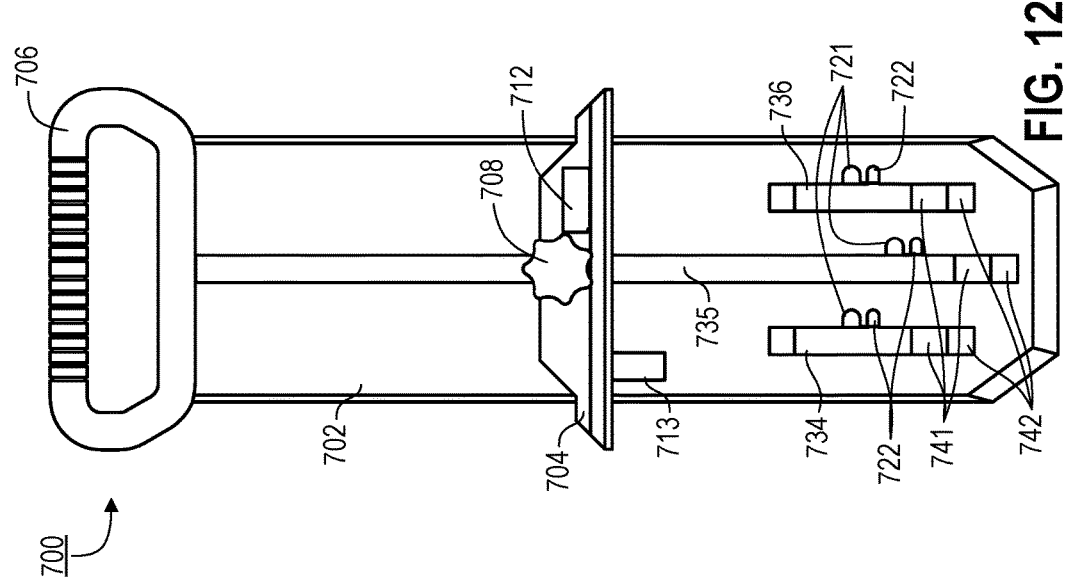

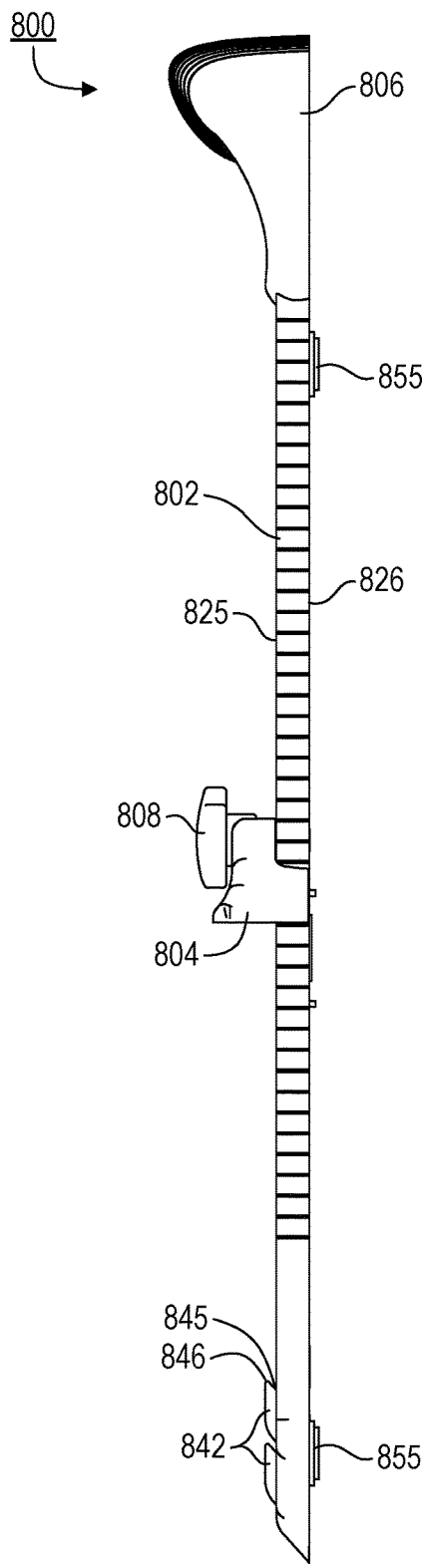
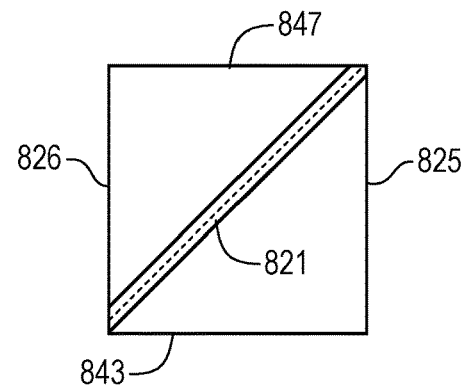
FIG. 23
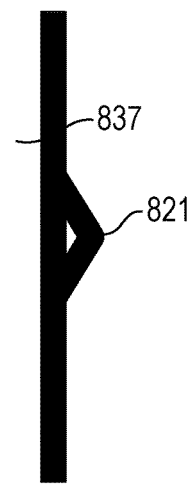
FIG. 24
FIG. 22
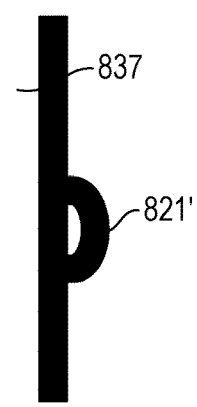
FIG. 25

APPARATUS FOR FACILITATING THE HANGING OF AN OBJECT ON A WALL

This application claims the benefit of U.S. Provisional Patent Application Ser. No. 62/438,571, filed Dec. 23, 2016, and is a continuation in part of U.S. patent application Ser. No. 15/146,118 (filed on May 4, 2016), which in turn claims the benefit of U.S. Provisional Patent Application Ser. No. 62/156,761 (the '761 application), filed on May 4, 2015. All the foregoing applications are incorporated by reference herein as though set forth herein in full.

FIELD OF THE INVENTION

The present invention concerns, among other things, tools and/or other apparatuses and devices that can be used in relation to the insertion of a fastener, such as a nail or screw, into a wall or other surface, e.g., for the purpose of hanging a picture or other item on the wall, as well as related techniques for using such tools and/or other apparatuses and devices.

BACKGROUND

Certain conventional tools have been provided for helping people to hang a picture on a wall. However, the present inventor has discovered that such existing tools typically have significant drawbacks. One example of a conventional tool is the Hang & Level™ sold by Under the Roof Decorating™. The present inventor has discovered that this particular product can be awkward and difficult to use, particularly for hanging large and/or heavy pictures or other items and/or when using picture-hanging hooks or other mounting hardware beyond just a simple nail.

SUMMARY OF THE INVENTION

The present invention addresses the foregoing problems by providing, among other things, improved tools for facilitating the hanging of pictures and other items, as well as related methods for using such tools.

Thus, in one respect, the invention is directed to an apparatus for facilitating the hanging of an object on a wall or other surface. The apparatus includes: a main body section having a front surface and an elongated first opening; an upper section connected to the main body section and having a protruding portion that protrudes away from the front surface; a lower section connected to the main body section and having a second opening for accepting, as well as a structure for holding, a hanging/attachment element; and a securing mechanism. The upper section is slidably attached to the main body section via the elongated first opening and thereby capable of moving vertically up and down said main body section, but can be temporarily fixed at a desired position along the main body section by using the securing mechanism.

In another respect, the invention is directed to an apparatus for facilitating the hanging of an object on a wall or other surface. The apparatus includes: a main body section having a first surface; an upper section connected to the main body section and having a protruding portion that protrudes away from the first surface; a lower section connected to the main body section and having an opening for accepting and holding a hanging/attachment element; and a securing mechanism. At least one of the upper section or the lower section is a slidable section that is slidably attached to the main body section and thereby capable of moving vertically up and down the main body section, but can be temporarily fixed (or secured) at an arbitrary position along the main body section using the securing mechanism.

In another respect, the invention is directed to an apparatus for facilitating the hanging of an object on a wall or other surface. The apparatus includes: a main body section having a first surface and a first portion of an elongated opening; an upper section connected to the main body section and having a protruding portion that protrudes away from the first surface; a lower section connected to the main body section and having a second portion of the elongated opening that includes structures for accepting and holding two different kinds of hanging/attachment elements; and a securing mechanism. The upper section is slidably attached to the main body section via the elongated opening and thereby capable of moving vertically up and down said main body section, but can be temporarily fixed at an arbitrary position along the main body section using the securing mechanism.

A method of using an apparatus according to the present invention involves: (a) placing the hanging/attachment element within an opening in the tool; (b) supporting an item to be hung from the hanging/attachment element while the hanging/attachment element is disposed within the opening; (c) following step (b), sliding the upper section down the main body section until the protruding portion makes contact with the item, thereby identifying a vertical position for the upper section; (d) following step (c), temporarily fixing the upper section at the position using the securing mechanism; (e) following step (d), removing the item from the hanging/attachment element; (f) following step (e), placing the apparatus at a location on a desired surface, with the upper section at the identified vertical position, and with a bottom edge of the protruding portion designating where a top edge of the item will be; and (g) with the apparatus placed at the location on the desired surface, and with the hanging/attachment element disposed within the opening, attaching the hanging/attachment element to the desired surface.

An alternate method of using an apparatus according to the present invention involves: (a) identifying an opening in the apparatus into which a hanging/attachment element eventually will be placed; (b) supporting an item to be hung from a structure (such as an upwardly angled support) associated with such opening; (c) following step (b), sliding the upper section down the main body section until the protruding portion makes contact with the item, thereby identifying a vertical position for the upper section; (d) following step (c), temporarily fixing the upper section at the position using the securing mechanism; (e) following step (d), removing the item from the apparatus and inserting the hanging/attachment element into the opening; (f) following step (e), placing the apparatus at a location on a desired surface, with the upper section at the identified vertical position, and with a bottom edge of the protruding portion designating where a top edge of the item will be; and (g) with the apparatus placed at the location on the desired surface, and with the hanging/attachment element disposed within the opening, attaching the hanging/attachment element to the desired surface.

By virtue of the foregoing arrangements, it can be possible to identify and preserve the distance between the top of a picture frame, mirror or other item to be hung and one or more hanging/attachment element(s), while the item to be hung is in a position (e.g., at a height) at which it is relatively easy to manipulate. Then, the item can be removed from the apparatus (or tool), and the apparatus alone (without the weight and bulk of the picture, mirror or other item to be hung) preferably is placed against a wall and used to insert the hanging/attachment element (e.g., mounting hardware) at a position that is appropriate to the desired location of the item to be hung.

The preferred embodiments of the present invention accommodate different types and sizes of hanging/attachment elements, e.g., including just a nail or screw alone and/or a picture-hanging hook (which typically is attached to a wall using a nail). In addition, the desired item (e.g., picture, other decorative item, mirror or clock) preferably is actually hung from the desired hanging/attachment element while such hanging/attachment element is within the tool, thereby accurately establishing the distance between the top of the item and the point(s) at which it will be hung under the actual hanging conditions (e.g., using the same hardware and with the full weight of the item applied). With this distance established and preserved, the tool typically can be used to accurately position the hanging/attachment element such that when the item is hung from it, the item will be at its desired location.

The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

FIG. 5 is a front elevational view of a portion of the tool with the two different types of hanging/attachment elements (a plain nail and a picture-hanging hook) seated within it.

FIG. 6 is a side sectional view of the portion of the tool shown in FIG. 5.

FIG. 12 is a front elevational view of a tool having a central slot for slidably attaching its upper section to its main body section.

FIG. 13 is a left side elevational view of the foregoing tool.

FIG. 14 is a rear elevational view of the foregoing tool.

FIG. 22 is a left side elevational view of the foregoing tool.

FIG. 23 is a plan view of the left inner surface of the narrower bottom portion of the central hook opening for the foregoing tool, showing the nail or screw slot within such surface.

FIG. 24 is an enlarged front elevational view of a portion of the tool, approximately centered around the opening for the nail or screw slot within such surface at the edge of the lower (hook) portion of the central opening, in which such slot has a V-shaped cross-section.

FIG. 25 is an enlarged front elevational view of a portion of a modified version of the tool, approximately centered around the opening for the nail or screw slot within such surface at the edge of the lower (hook) portion of the central opening, in which such slot has a curved or rounded cross-section.

DESCRIPTION OF THE PREFERRED EMBODIMENT(S)

Figure 1:
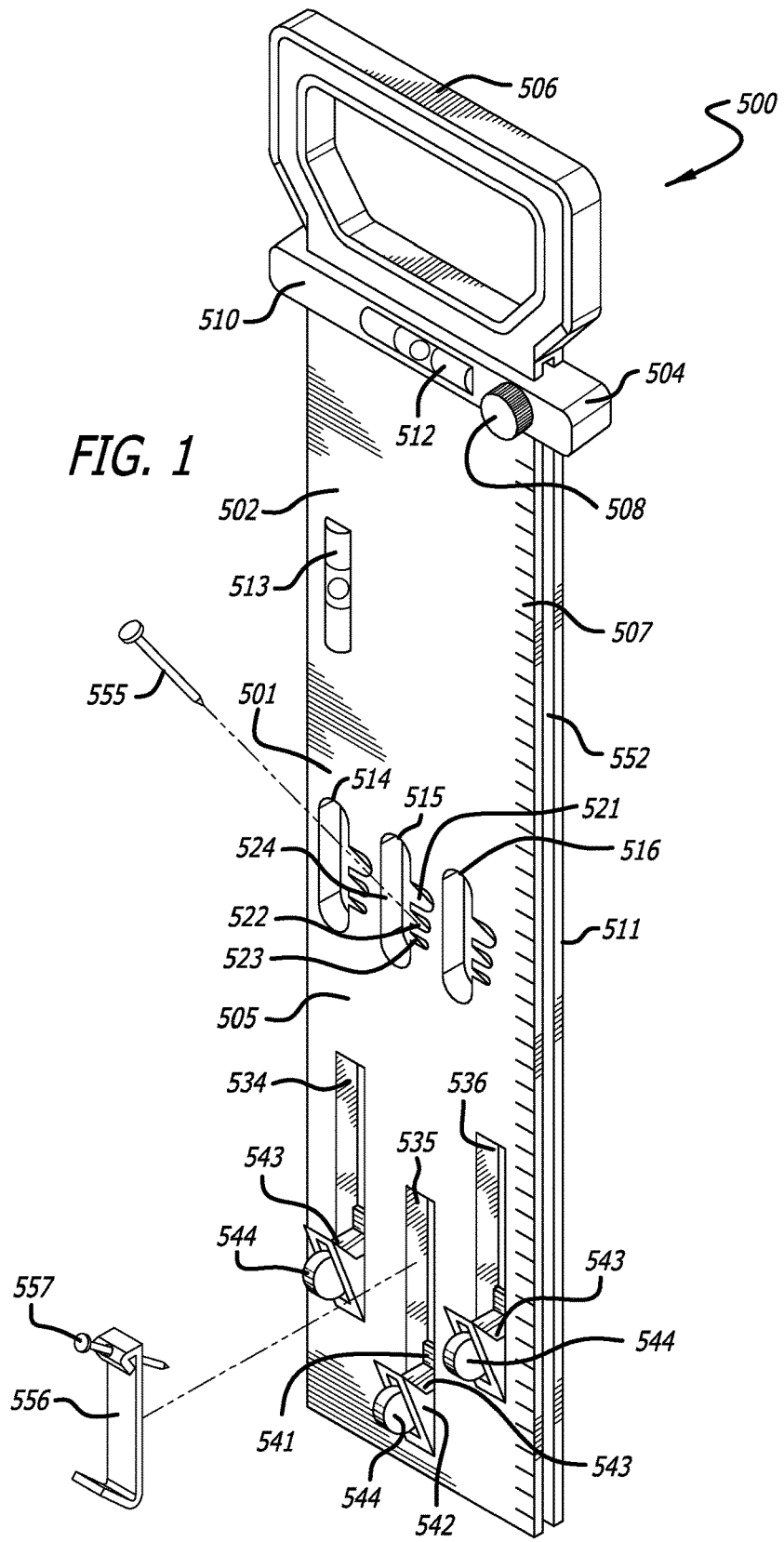
FIG. 1 is a perspective view of a tool having side slots according to the present invention, with two different types of hanging/attachment elements (a plain nail and a picture-hanging hook) exploded out from it.
Figure 2:
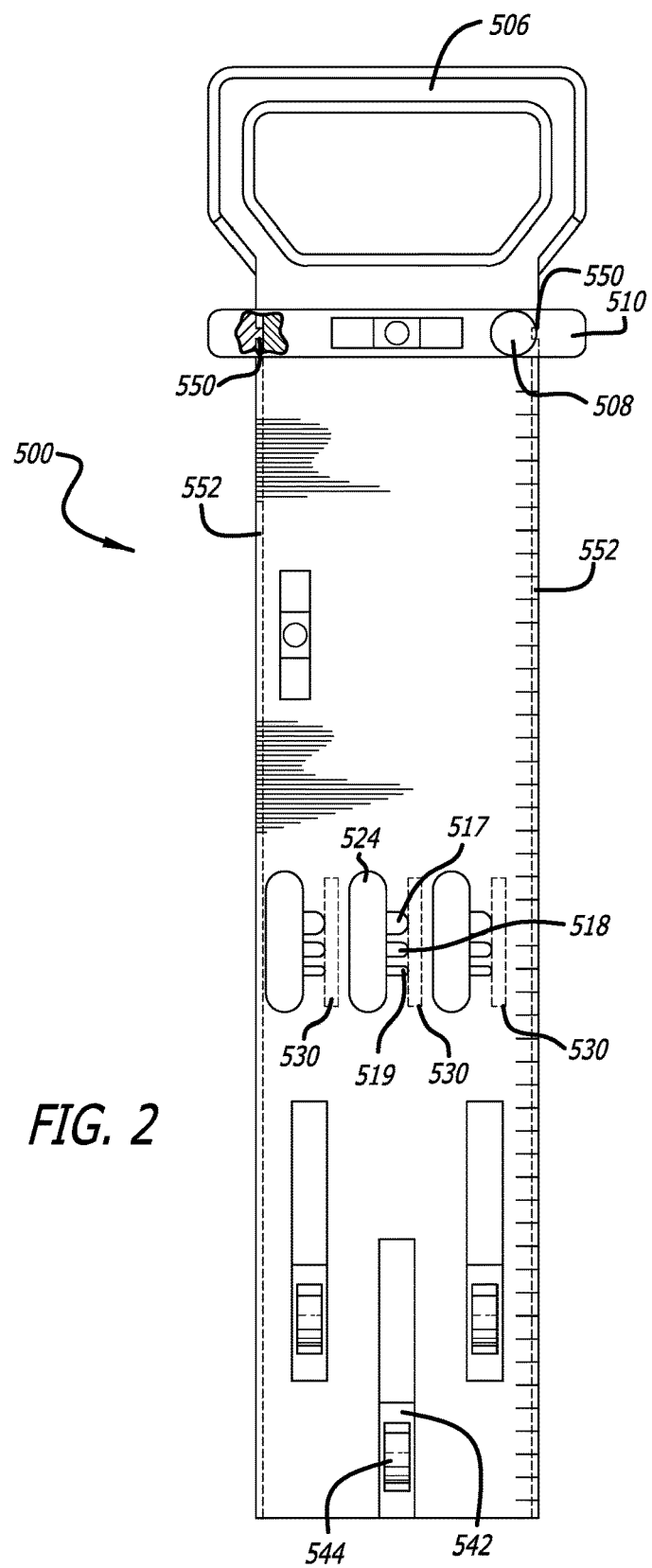
FIG. 2 is a front elevational view of the tool.

Certain tools for facilitating the hanging of a picture or other item were disclosed in the '761 application. Another exemplary tool 500 for a similar purpose is illustrated in FIGS. 1-6. As shown, tool 500 includes a main body section 502, which preferably is an elongated, substantially rectangular structure. Disposed closer to the top end of the main body section 502 is an upper section 504, and disposed closer to the bottom end of the main body section 502 is a lower section 505. In ordinary use, tool 500 is oriented as shown in FIGS. 1-6, with the main body section 502 being substantially vertical and with the upper section 504 disposed above the lower section 505. Preferably, a handle 506 is disposed above the upper section 504. Also, in the preferred embodiments length-measuring (or ruler) markings 507 are provided along the length of the tool 500 for the user's reference.

It is noted that the attached drawings frequently show different types of hanging/attachment elements (e.g., both a simple nail 555 and a picture-hanging hook 556) disposed within a tool according to the present invention (e.g., tool 500) at the same time. However, such depictions merely show the different ways in which the tool 500 can be used. Ordinarily, only one type of hanging/attachment element will be used at any given time.

Also, in the current embodiment, for reasons which will become apparent below, upper section 504 is slidably attached to the main body section 502 of the tool 500, while the lower section 505 is fixedly connected to (and more preferably, integrally formed with) the main body section 502. However, in alternate embodiments, upper section 504 is fixedly connected to the main body section 502, and lower section 505 is slidably attached to the main body section 502. In still further embodiments, both upper section 504 and lower section 505 are slidably attached to the main body section 502. In any event, the distance between upper section 504 and lower section 505 preferably can be varied by a user, and once a desirable distance has been identified the two sections 504 and 505 can be temporarily fixed relative to each other through the use of a securing mechanism (as discussed in more detail below). Although the upper section 504 is slidably attached to the main body section 502, and lower section 505 is fixedly connected to it in the current embodiment, no loss of generality is intended, and descriptions relating to the sliding of upper section 504 can apply to lower section 505 in those embodiments in which it (also or instead) is slidable. In certain embodiments, clearance is provided between the slidable section(s) and the main body section 502 so that such slidable section(s) can pass over any components that protrude forward of the front surface 501.

In the current embodiment, upper section 504 includes tabs 550 on each side that engage with slots 552 on the left and right edges of main body section 502 (e.g., in a tongue-and-groove manner), thereby allowing the upper section 504 to slide along main body section 502. However, in alternate embodiments, other sliding mechanisms (e.g., such as by providing one or more tabs on upper section 504 that engage with corresponding slot(s) on the front surface of main body section 502) are used. Preferably, however, any engagement between the upper section 504 and the main body section 502 is confined to the side edges and/or front surface of main body section 502, and the rear or back surface 511 of the entire tool 500 (i.e., including the combination of the rear surfaces of the main body section 502 and any fixedly attached sections) is completely flat (e.g., so that any slidable sections do not extend beyond this flat surface).

Also, depending, e.g., upon the type of securing mechanism used, it sometimes will be preferable to provide sufficient friction between the slidable section(s) and the main body section 502 so that they can only be slid relative to each other by applying manual force (e.g., gravity alone being insufficient). However, particularly for embodiments where both sliding and securing can be accomplished simultaneously with a user's single hand (e.g., as described below), in some cases such friction might be unnecessary and/or result in more of a burden than any benefit it would provide.

Each slidable section (only upper section 504 in the current embodiment) preferably includes (or at least has associated with it) a securing mechanism, allowing a user to slide it up and down the main body section 502 when desired and then temporarily secure (or lock) it into a desired position. For the current embodiment of tool 500, upper section 504 includes a set screw 508 for this purpose (which, although shown in a particular location in the drawings, can in fact be located anywhere on the upper section 504). Preferably, in order to avoid having to use a screwdriver, set screw 508 is provided with wings, tabs, or some other large structure at its head, so that a user can turn (i.e. tighten or loosen) the screw 508 with his or her fingers alone. When the securing mechanism comprises such a set screw 508, friction between the corresponding slidable section and the main body section 502, as described in the preceding paragraph, can be provided, if desired, in order to lessen the likelihood that the slidable section (i.e., upper section 504 in the current embodiment) will move inadvertently between the time that it is moved into the desired position and the time that set screw 508 can be adequately tightened to secure it into that position.

As indicated above, in the present embodiment upper section 504 slides vertically up and down along main body section 502 and includes a protruding portion 510 extending forward of the front surface 501 of main body section 502. In the preferred embodiments, such protruding portion 510 is elongated, substantially straight (or at least has a substantially straight bottom edge) and oriented horizontally when the tool 500 is used (i.e., substantially perpendicular to the vertical direction in which the upper section 504 slides relative to the main body section 502). In the current embodiment, the protruding portion 510 constitutes substantially all of upper section 504, so the two sometimes are referenced herein interchangeably; however, no loss of generality is intended. Once again, the rear surface 511 of tool 500 preferably is completely flat, thereby allowing it to make maximum contact with a wall 560 or similar surface. Still further, as shown, e.g., in FIG. 1, in the current embodiment upper section 504 (and, more specifically in the current embodiment, the protruding portion 510 of upper section 504) includes a level 512 (e.g., oriented horizontally for determining when protruding portion 510 is perpendicular to gravitational pull). However, level 512 instead could be provided on any other portion of tool 500. In addition, another level 513, perpendicular to level 512, preferably is provided on the main body section 502 (although it too instead could be provided on any other portion of tool 500). Also, although shown extending forward of the front surface 501 (e.g., in FIG. 1), in alternate embodiments level 513 is fully embedded within the tool 500 so as to lessen the need for the clearance (discussed above) between upper section 504 and the main body section 502.

As also indicated above, lower section 505 of tool 500 is integrally formed with the main body section 502. As shown, lower section 505 includes one or more openings (a total of 12 openings in the current embodiment), each for accommodating (e.g., accepting and holding) a hanging/attachment element, such as a simple conventional nail 555 or screw, or a conventional picture-hanging hook 556 (which typically is attached to a wall 560 with a nail 557). More specifically, in the current embodiment lower section 505 includes three sets 514-516 of openings. Each such set (set 515 being representative), in turn, includes three openings 517-519 through the lower section 505 of the tool 500. As shown, the sets 514-516 are aligned horizontally and are uniformly spaced apart from each other in the current embodiment, with the openings 517-519 of set 515 being centered on the tool 500 (preferably also centered on lower section 505). As also shown, each of such openings 517-519 is disposed at the end of a corresponding horizontal slot 521-523, having the same width as its respective opening 517-519, in the current embodiment.

In this latter regard, each of the openings 517-519 is sized differently, with opening 517 being the widest and with openings 518 and 519, respectively, being progressively narrower. As will be readily appreciated, openings 517-519 are configured for accepting and holding a nail, screw or similar simple hanging/attachment element. Because the openings 517-519 have different widths, each can be appropriate to a different-sized nail (or other hanging/attachment element), i.e., nails and/or screws having different shaft widths. In any event, in the present embodiment all of the horizontal slots 521-523 within a given set (again, set 515 being representative) terminate at their right ends in a wider vertically oriented opening (or slot) 524. As discussed in greater detail below, each such opening 524 preferably is wide enough to allow the head of any nail, screw or similar hanging/attachment element that is intended to be used to pass through it.

As shown most clearly in FIG. 6, openings 517-519 preferably are angled downwardly from front to rear (e.g., at approximately 45° relative to the front surface 501) through the depth of lower section 505, so that a nail 555 or screw will be inserted into the wall 560 (or other surface) at the same angle. However, in alternate embodiments, any other angle may be used, or such openings 517-519 might be made entirely horizontal in this dimension, e.g., depending upon user preference, the type of material of which the wall 560 is made, whether the hanging/attachment element is being inserted into a stud, an anchor (or other female receptacle), or just drywall alone, etc. Also, in still further embodiments, multiple different slots for accommodating a nail or screw, each providing a different angle (e.g., both 45° and 90° relative to the front surface 501), are provided.

Figure 10A:
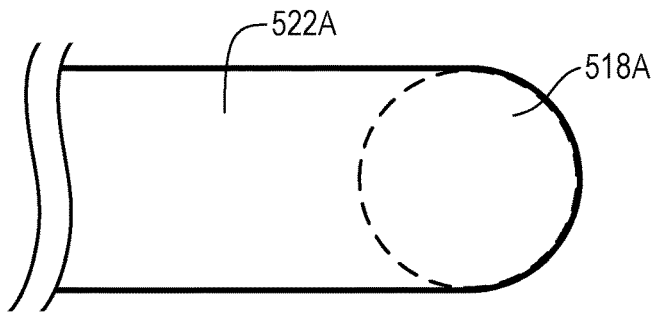
FIG. 10A is a front conceptual view of a first configuration of a nail/screw opening and adjacent portion of its corresponding slot.
Figure 10B:
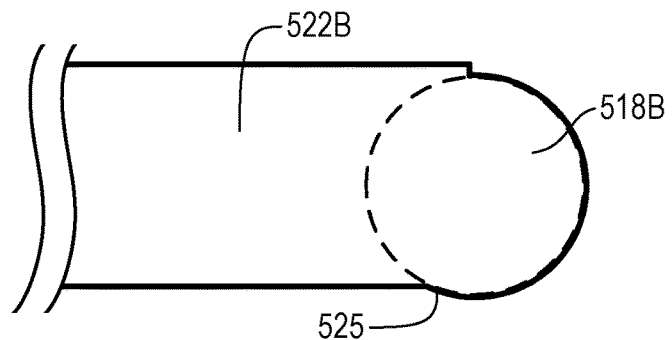
FIG. 10B is a front conceptual view of a second configuration of a nail/screw opening and adjacent portion of its corresponding slot.
Figure 10C:
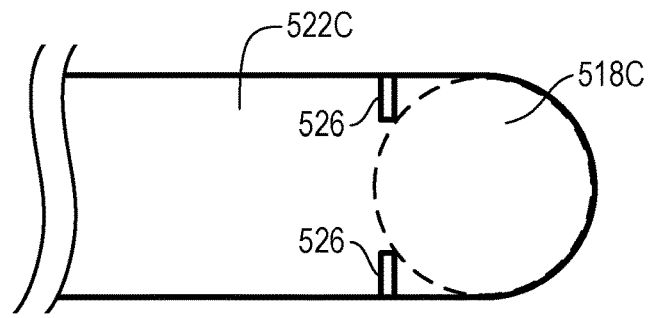
FIG. 10C is front conceptual view of a third configuration of a nail/screw opening and adjacent portion of its corresponding slot.

In the present embodiment, each of the openings 517-519 can be considered just the (e.g., circular) left end portion of its corresponding slot 521-523, i.e., with no specific demarcation between any given one of the openings 517-519 and its corresponding slot 521-523 (e.g., as shown more clearly with reference to opening 518A and slot 522A in FIG. 10A). However, in alternate embodiments, e.g., to help maintain the hanging/attachment element within its corresponding opening 517-519, each opening 517-519 is physically distinguishable from its corresponding slot 521-523, e.g., with each such opening 517-519 disposed slightly lower than its corresponding slot 521-523 (e.g., as shown with reference to opening 518B and slot 522B in FIG. 10B), essentially resulting in a notch 525, and/or with a small tab 526 extending inwardly from the top and/or bottom edge of the opening 518 (e.g., as shown with reference to opening 518C and slot 522C in FIG. 10C). The tab(s) 526 (when provided) can be integrally formed with the lower section 505 (e.g., molded as a single piece of plastic), or can be separate pieces that are inserted (e.g. snapped or screwed) into the surfaces from which they protrude. In addition, such tab(s) 526 (when provided) preferably are resilient, thereby allowing a screw, nail or similar hanging/attachment element to be snapped into the opening 518C.

Still further, referring again to FIG. 2, for similar reasons (e.g., to help maintain the hanging/attachment element within its corresponding opening 517-519), a magnet 530 preferably also (or instead) is provided adjacent to each opening 517-519 (in the present embodiment, embedded within the lower section 505 just to the left of each such opening 517-519, with a single elongated magnet 530 provided for each set 514-516 of openings).

Three additional openings 534-536 within lower section 505 are configured for accommodating (e.g., accepting and holding) conventional picture-hanging hooks. For this purpose, in the current embodiment, each of openings 534-536 is accompanied by (in reference to opening 535) a short backing section 541, an upwardly angled front section 542 and a bottom section (or bottom support) 543, with the combination of these elements 541-543 providing a location to seat the picture-hanging hook 556. Because most such conventional picture-hanging hooks include a vertical backing section and, at its bottom, a hook that is angled, relative to the backing section, at approximately 45°, in the current embodiment upwardly angled support 542 preferably also is angled at (or approximately at) 45°. Bottom support 543 preferably is long enough (e.g., 2-5 mm to accommodate the largest anticipated picture-hanging hook 556 and to provide adequate clearance from the front surface 501. Such an arrangement typically can allow the user to simply drop the picture-hanging hook into the bottom portion of any desired opening 534-536. However, in alternate embodiments, other structures and/or mechanisms can be used for holding a picture-hanging hook within the tool (e.g., clamping mechanism(s) to adjust the width of the openings 534-536 and/or to adjust the length of bottom support 543, etc.).

Similar to the nail-holding structures described above, a magnet 544 preferably is provided adjacent to each of the openings 534-536 to help hold the corresponding picture-hanging hook in place. In the present embodiment, a separate magnet 544 (such as a Velleman™ MAGNET8™ button-type or barrel-shaped rare-earth magnet) is provided below each such opening 534-536 (i.e., in the present embodiment, below the corresponding upwardly angled support 542). However, in alternate embodiments a single (e.g., bar) magnet is adjacent to (and, therefore, retains hanging/attachment elements within) multiple or even all of such openings 534-536. Whatever type and/or quantity of magnet(s) 544 used, they typically will be hidden from view (contrary to the depiction in the present drawings). In addition to, or instead of, magnets, other structures or devices, such as clamping mechanisms and/or clips, can be used to secure any or all of the hanging/attachment elements (e.g., simple nails 555 or screws, or picture-hanging hooks 556) accommodated by the tool 500. As discussed in greater detail below, the opening above the short backing section 541 (e.g., opening 535) preferably is sufficiently far above the top of the largest picture-hanging hook 556 that is expected to be used, to allow the tool 500 to be removed after the nail 557 (or similar hanging/attachment element) has been at least partially inserted into the wall 560 or other surface.

Unlike the nail-holding openings 517-519 discussed above, openings 534 and 536 preferably are aligned horizontally, but opening 535 is disposed lower to help prevent interference with the unused opening(s) when the pair of openings 534 and 536 are being used or when the single opening 535 is being used. In addition, opening 535 preferably is centered on the tool 500 and openings 534 and 536 are evenly spaced from opening 535, so that the center opening 535 can be used if just a single picture-hanging hook is to be used for hanging the desired item, or else the two outer openings 534 and 536 can be used if two hooks are to be used. Preferably, each of the openings 534-536 is large enough (e.g., at least 2-3 inches high and, more preferably, at least 2½ inches high and sufficiently wide) to accommodate the largest picture-hanging hook that is intended to be used with the tool 500. In the alternate embodiments (discussed above) in which the hook 556 is clamped into the desired opening 534-536, it might be possible to obtain more accurate positioning, e.g., if a hook much narrower than the largest accommodated is being used.

Figure 7:
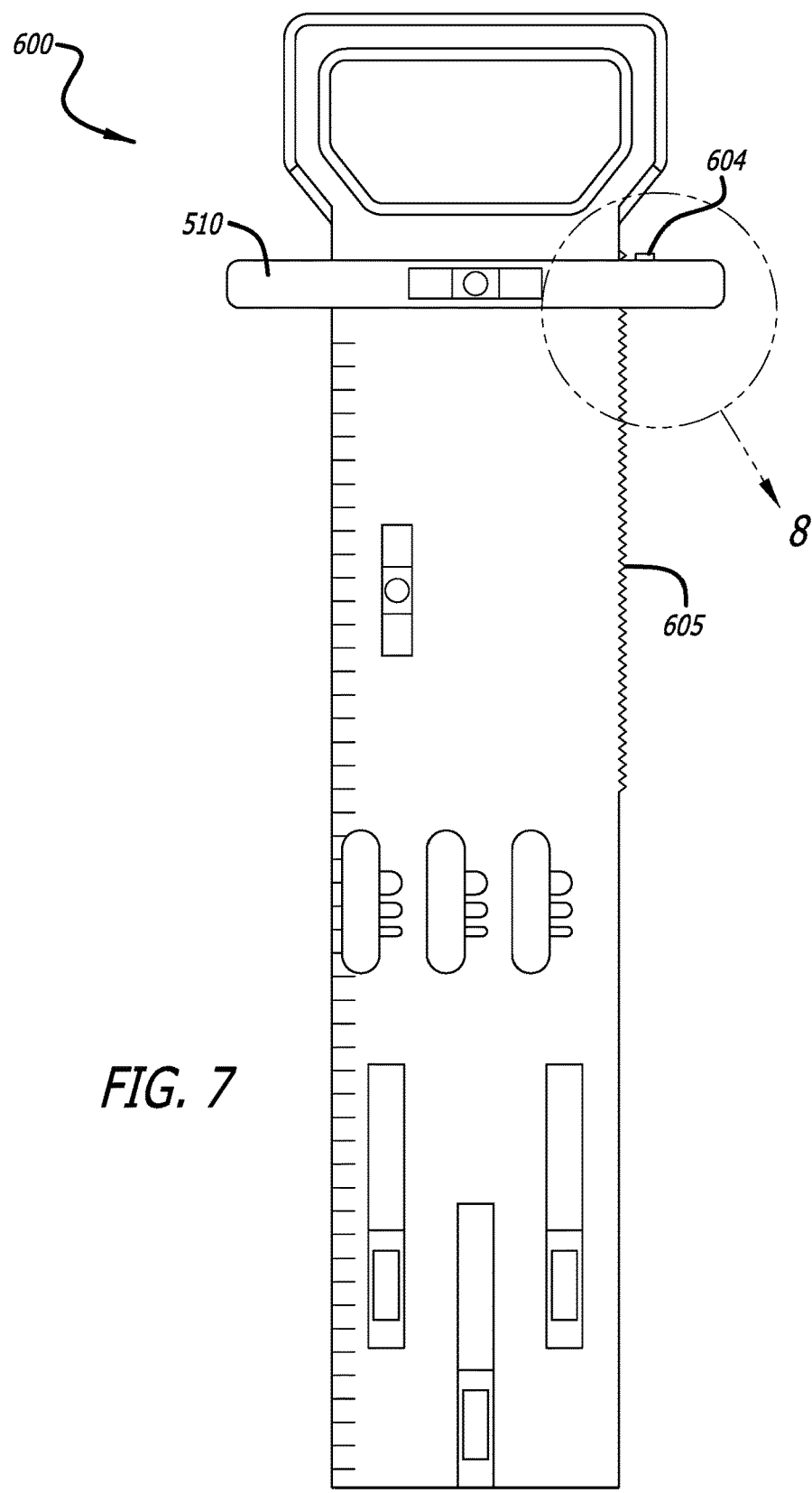
FIG. 7 is a front elevational view of a tool having side meshing elements.

In the embodiment described above, a set screw 508 is used as the securing mechanism for securing the upper section 504 at a desired position. However, other mechanisms are used in alternate embodiments. For example, the tool 600 shown in FIG. 7, uses a retractable (preferably spring-biased) engagement element 602 (shown in greater detail in FIGS. 8 and 9. In this alternate embodiment, engagement element 602 includes one or more components that engage with one or more vertically arranged sequences of slots, notches, teeth, etc., on one or more surfaces of the main body section 502 (in the current embodiment, on the edge of the main body section 502.

Figure 8:
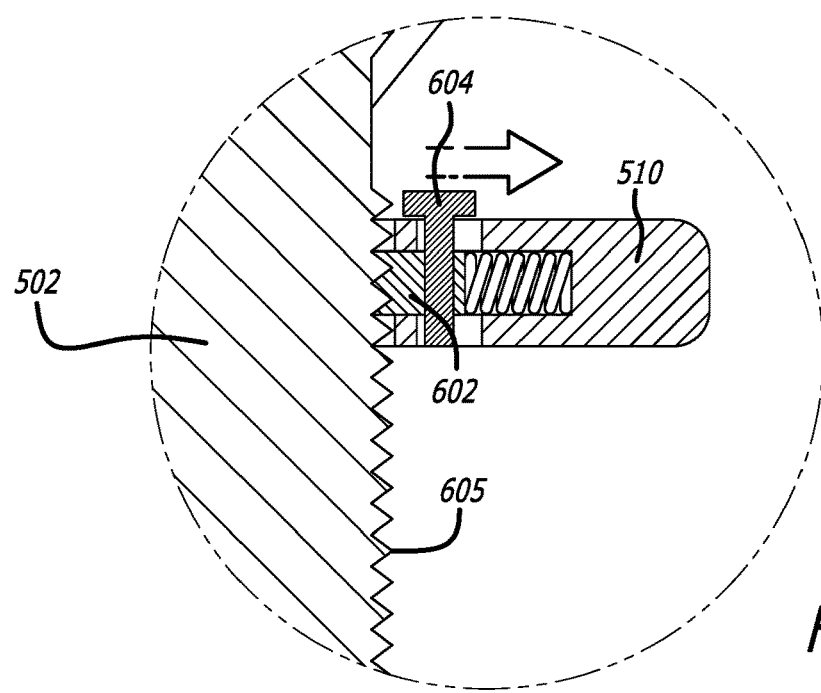
FIG. 8 is a side sectional view of a portion of the foregoing tool, showing the engagement element engaged with notches on a surface of the main body of the tool, thereby temporarily locking the upper section into position.
Figure 9:
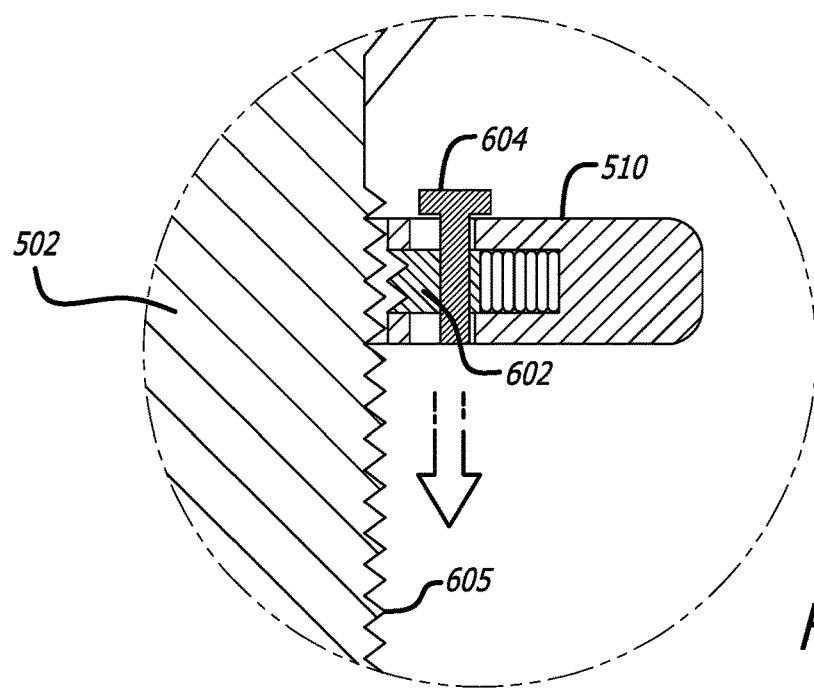
FIG. 9 is a side sectional view of a portion of the foregoing tool, showing the engagement element disengaged from the notches on the surface of the main body of the tool, thereby allowing the upper section to slide along the main body of the tool.

As indicated above, the engagement element 602 preferably is spring-biased against the surface of the main body section 502, i.e., so that its default position is to engage and thereby prevent sliding of the upper section 504. In such embodiments, a release actuator 604 preferably is provided to disengage engagement element 602. In the current embodiment, as shown in FIGS. 8 and 9, the release actuator 604 is implemented as a tab, fixedly attached to the engagement element 602, on the upper section 504. As a result, simply pressing release actuator 604 outwardly retracts (i.e., disengages) the engagement element 602, allowing upper section 504 to be slid, and then releasing release actuator 604 causes engagement element 602 to be re-engaged at that position, thereby inhibiting any further sliding. Typically, upper section 504 can be slid and release actuator 604 can be simultaneously operated with the use of a single hand.

In the current embodiment, the securing mechanism uses meshing elements (e.g., teeth, notches, slots, etc.), one or more on the engagement element 602 and a sequence of meshing elements 605 on the main body section 502. One benefit of this approach is that a more secure attachment often can be achieved. However, the cost of doing so is that the attachment can only be made at discrete positions along the length of the main body section 502. On the other hand, if the spacings between such slots or notches is made small enough, the importance of this drawback can be minimized. Nevertheless, in alternate embodiments, the engagement element 602 just makes frictional contact with the main body section 502 of tool 500, thereby allowing the upper section 504 to be secured at any desired location.

In another alternate embodiment, similar to that described above, the release actuator 604 is provided on the inner surface of a handle that extends from the protruding portion 510 (e.g., at or near the center of protruding portion 510, where the level 512 is located in the current embodiments) or from some other portion of upper section 504, and the engagement element 602 preferably engages with the front surface 501 of the main body section 502. As a result, upper section 504 can be slid and the engagement element 602 engaged and disengaged with the use of a single hand operating the handle. That is, squeezing the handle retracts the engagement element 602, allowing the handle to be used to slide the upper section 504 up and down. However, as soon as the user stops squeezing the handle, by default engagement element 602 re-engages with the main body section 502, thereby inhibiting any further sliding. In this alternate embodiment, the horizontal level 512 can be relocated to another position on the tool 500, so that it will not be obscured by the user's hand in ordinary use.

In a still further embodiment, the release actuator 604 is provided on handle 506. In such an embodiment, if the handle 506 is fixedly attached to the main body section 502, the engagement element 602 preferably is provided on the main body section 502, and it engages with a surface (e.g., flat or a sequence of notches) on the slidable upper section 504. More generally, it should be noted that the engagement element 602 and the release actuator 604 can be provided on either or both of the main body section 502 and the movable section (e.g., upper section 504). Also, although the engagement element 602 generally is discussed herein as continually tending toward engagement, in other embodiments a stop is included and may be activated by the user to allow the user to maintain the engagement element 602 in the disengaged state without continuous application of manual force.

In still further embodiments, engagement element 602 need not be spring-biased. However, in many of such further embodiments, engagement element 602 then essentially functions in a manner similar to a set screw, typically requiring some additional manual action to lock it into place. More generally, a securing mechanism used in the present invention can take any of a variety of different forms, e.g., button, screw or quick-release mechanism and can be located anywhere on the tool 500.

It is noted that each of the foregoing embodiments uses horizontal slots (e.g., slots 521-523) between the nail or screw openings (e.g., openings 517-519) and the corresponding wider vertically oriented opening (e.g., opening 524). While such horizontal slots can sometimes help reduce the likelihood that the hanging/attachment element within a particular opening (e.g., any of openings 517-519) might accidentally slide into the wider vertically oriented opening 524, in alternate embodiments such horizontal slots are omitted, particularly in alternate embodiments in which adequate means are provided for securing the hanging/attachment element.

Also, in the foregoing embodiments separate sliding and securing mechanisms are provided in relation to the slidable section(s). However, in alternate embodiments a single structure is used to accomplish both functions. For instance, some of such alternate embodiments employ a slot-and-tab (e.g., tongue-and-groove) structure, such as described above in connection with slots 552 and tabs 550. However, unlike the previously described embodiment, in such alternate embodiments the tab on the upper section 504 is expandable (e.g., a threaded structure or a spring-biased or resilient structure) and retractable, so that it can be made to press against the inner walls of the slot (or mesh with structure on such inner walls) when desired to temporarily fix (or secure) the position of the upper section 504, and then made to retract (and thereby disengage or simply reduce friction with such inner walls) when it is desired to slide the upper section 504. As with the previously described embodiment, in such alternate embodiments the tab-and-slot combination can be located anywhere on the tool 500, e.g., on the side edges (as in the specific embodiment described above) and/or on the front surface 501.

As indicated above, the lower section 505 preferably is just defined so as to include one or more of the hanging/attachment element openings. An exact dividing line between the lower section 505 and the main body section 502, therefore, typically is not critical and can be set, e.g., just above openings 514-516 or just above openings 534-536. Similarly, it generally is not necessary for the upper section 504 to be capable of sliding along the entire length of main body section 502, but rather just along some (typically, a substantial) portion of it. Also, in some embodiments, upper section 504 also is capable of sliding along some portion of lower section 505. The main consideration in these types of embodiments is that the upper section 504 is capable of sliding sufficiently to come into contact with the top of a picture or other item to be hung, as described in greater detail below. As discussed elsewhere, in alternate embodiments the lower section 505 also (or instead) is capable of sliding relative to the main body section 502, and in these embodiments, similar considerations pertain to the range of its sliding motion.

Figure 11:
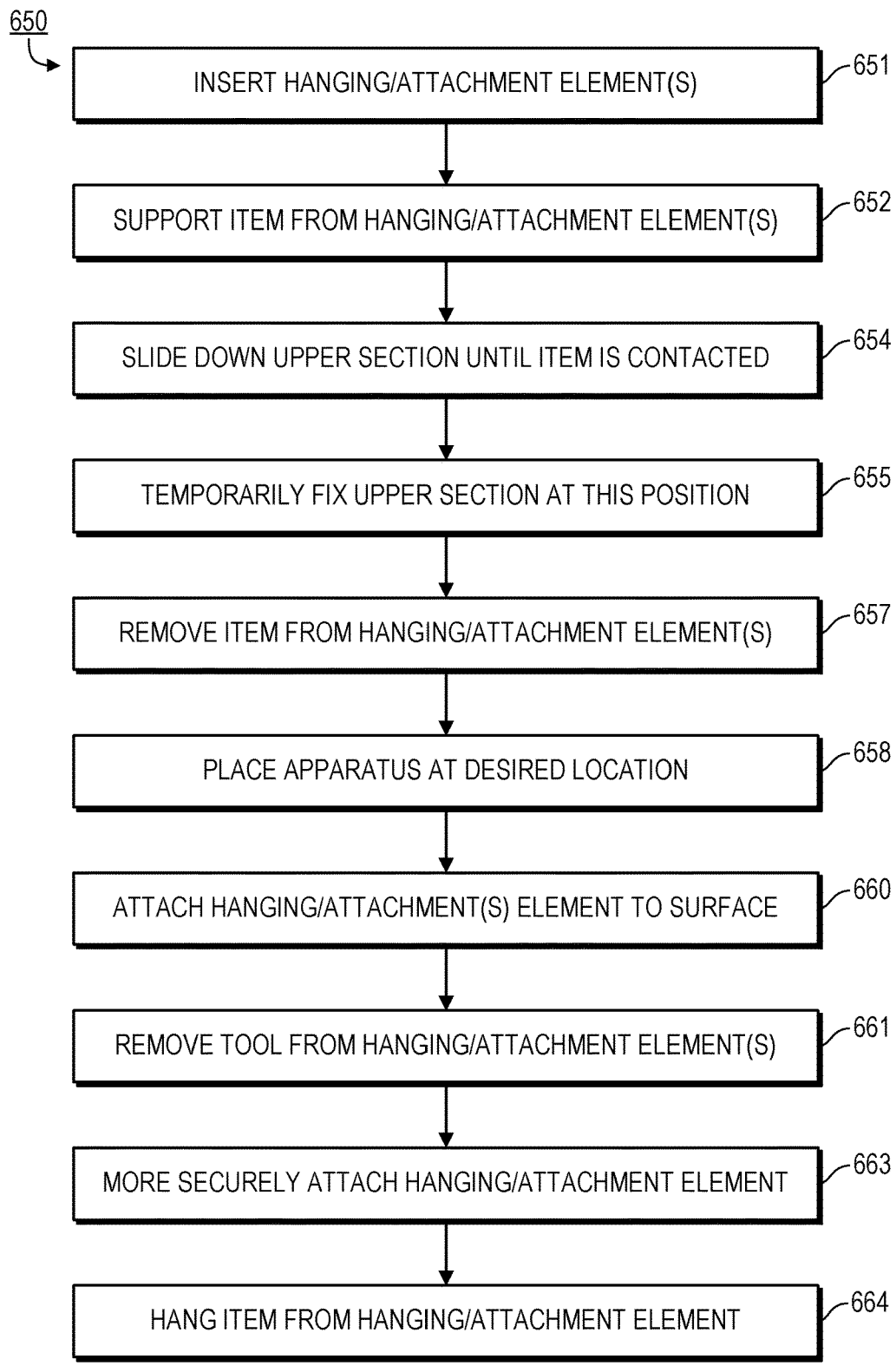
FIG. 11 is a flow diagram illustrating a process for hanging an item using a tool according to the present invention.
Figure 15:
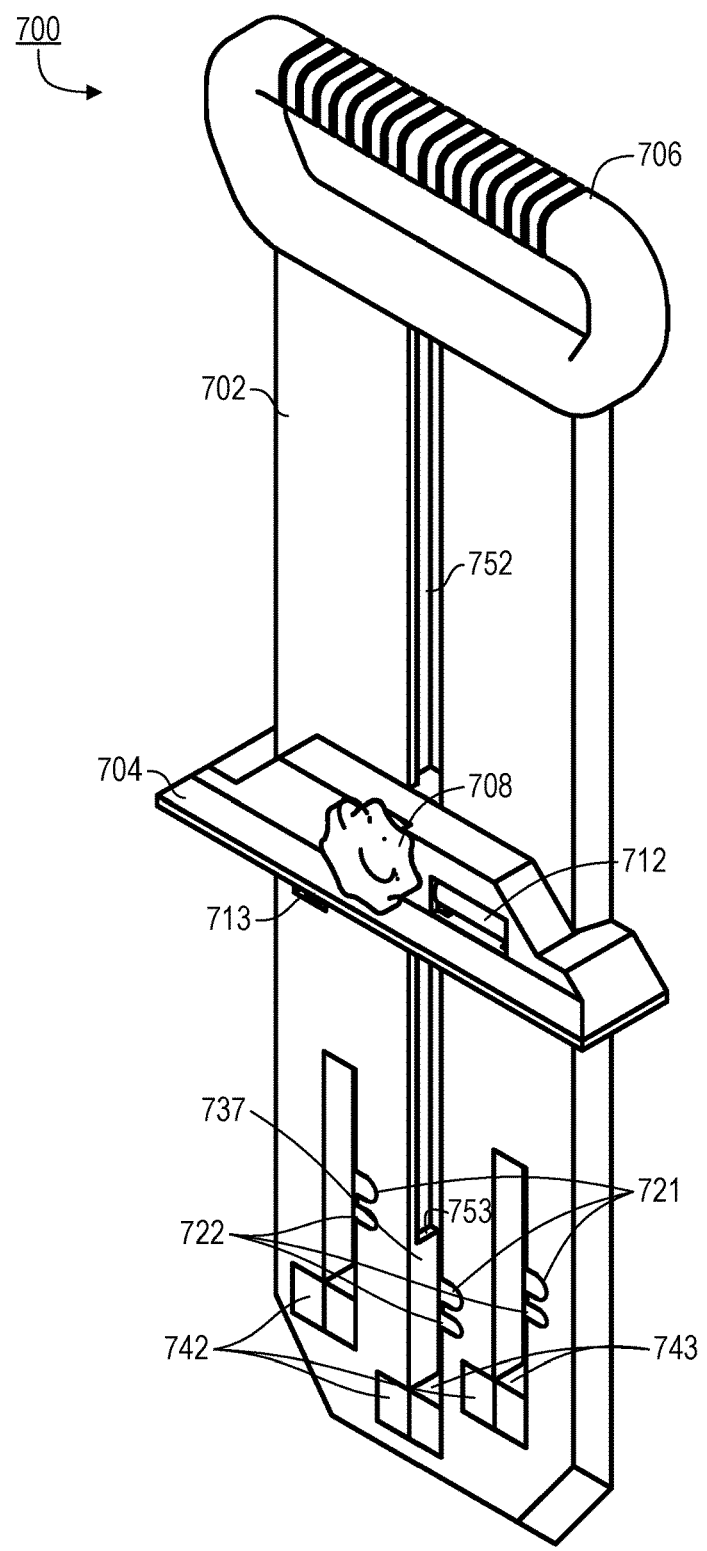
FIG. 15 is a top-left-side perspective view of the foregoing tool.

A method 650 for using a tool according to representative embodiments of the present invention (e.g., tool 500 or 600) is now discussed, primarily in reference to FIG. 11, but also with additional references to certain of the other drawings. Although the following discussion generally refers to tool 500, such references are for convenience only and may be replaced with references to any other tool, e.g., according to the present invention.

Initially, in step 651 the hanging/attachment element(s) (usually just one, or a pair of the same type and size) are inserted into the tool 500. For instance, a nail 555 or screw might be inserted into the appropriate sized opening of 517-519 of the middle set 515 (when a single hanging/attachment element is to be used), or one might be inserted into each of the appropriate sized openings in each of the outer sets 514 and 516 (when two hanging/attachment elements are to be used). Preferably, in order to avoid unnecessary movement of such nail or screw, the smallest opening 517-519 that can accommodate such nail or screw is used. Alternatively, a picture hanging hook 556 might be inserted into the middle opening 535 (when a single hanging/attachment element is to be used), or one might be inserted into each of the outer openings 534 and 536 (when two hanging/attachment elements are to be used). In certain cases, the picture hanging hook 556 is tilted rearwardly to make contact with the short backing section 541. As noted above, in the preferred embodiments, a mechanism is provided (e.g., a magnet 530 or 544, a notch 525, one or more tabs 526 and/or a clip) for automatically helping to hold such hanging/attachment element(s) in place. In other embodiments, the user instead (or in addition) manually adjusts a mechanism (such as one or more clamps that adjust the size of the corresponding openings) to help secure the hanging/attachment element(s) in place. In other embodiments, e.g., as discussed in greater detail below, this step 651 is omitted entirely.

Next, in step 652, the item to be hung (e.g., a framed picture, some other type of decorative item or a wall clock) is supported from such hanging/attachment element(s) which were inserted in step 651 (or from some portion of the tool, e.g., as discussed in greater detail below). Preferably, the hanging/attachment element(s), if inserted in step 651, remain in the tool 500, and the item is hung from such hanging/attachment element(s) in the same manner that it would/will be when hanging on the wall 560. For this purpose, e.g., a hanging wire, notch or other structure on the item is engaged with the hanging/attachment element(s) and then the entire tool 500 is lifted by the handle 506 so that the full weight (or at least sufficient weight) of the item to be hung is applied to the hanging/attachment element(s) to simulate the situation that will occur when such item is hung on the wall 560 (or other desired surface), e.g., the hanging wire or string (if any) is pulled taut and any stretching of it occurs.

Figure 3:
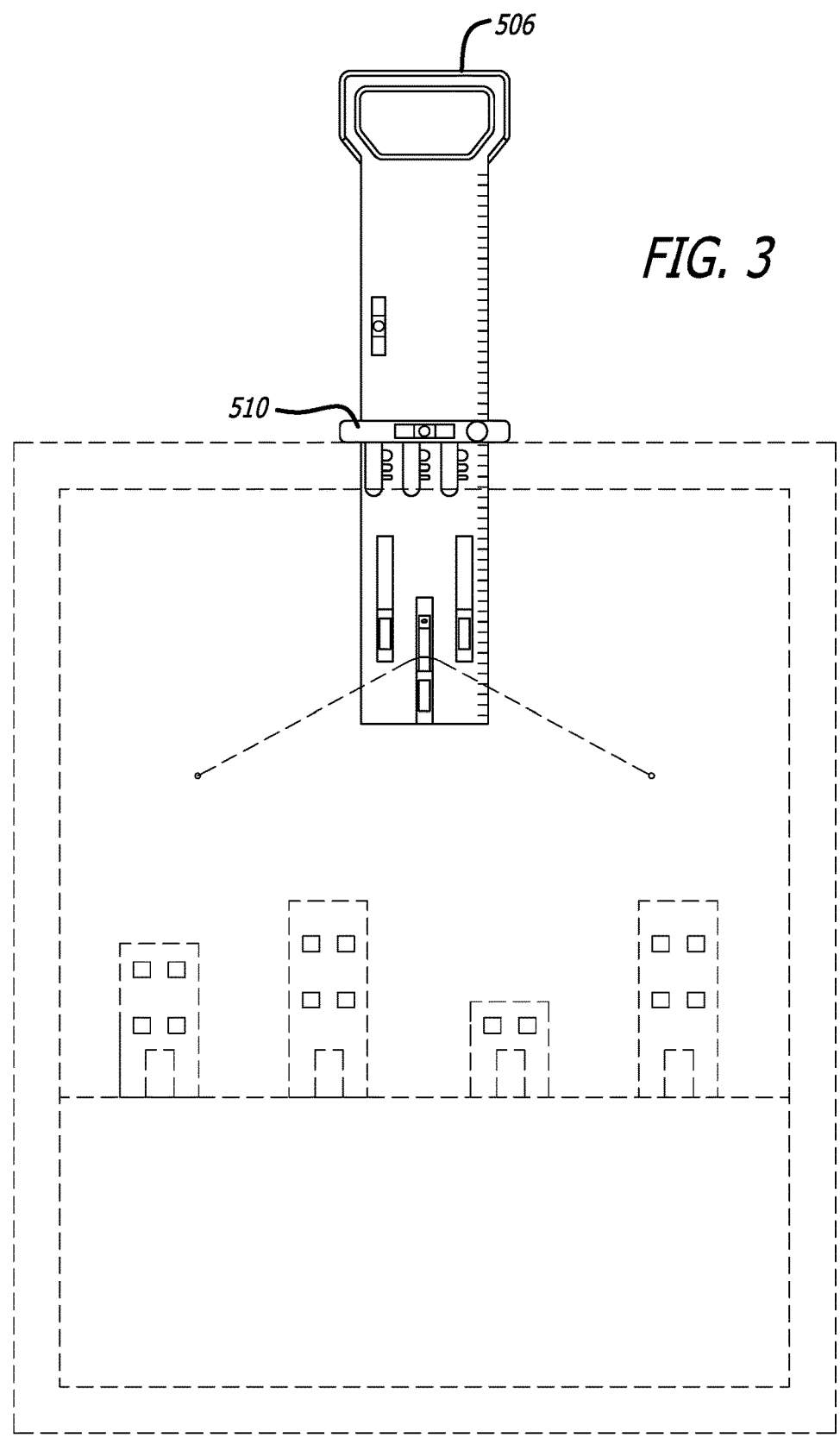
FIG. 3 is a front elevational view of the tool in use, immediately after having been adjusted to an item that is intended to be hung on a wall or other surface.

Next, in step 654, with the item to be hung preferably still supported by the hanging/attachment element(s), the upper section 504 is slid down until the bottom edge of protruding portion 510 makes contact with such item to be hung, e.g., with the results shown in FIG. 3. For this reason, in certain embodiments such bottom edge of protruding portion 510 is made of (or coated with) plastic, rubber or some similar material that is less likely to scratch or otherwise damage the item. Preferably, upper section 504 begins this process 650 at its very highest point. Prior to sliding upper section 504, any actions necessary to make it slidable (e.g., loosening of a set screw 508, or retracting or otherwise disengaging an engagement element 602) preferably are performed.

Next, in step 655, the upper section 504 is temporarily fixed (or secured) at the position identified in step 654, e.g., using a provided securing mechanism, such as by tightening set screw 508 or engaging engagement element 602. In certain embodiments, this step 655 is performed by the user's other hand (i.e., the one not holding handle 506). For example, for embodiments in which a set screw 508 is used, gravity typically will maintain upper section 504 (more specifically, the bottom edge of its protruding portion 510) in contact with the top of the item, so that the user's other hand can be used to tighten the set screw 508. In certain embodiments in which an engagement element 602 is used as the securing mechanism, the user's other hand, which has been used to slide the upper section 504 into position, simply releases pressure on the release actuator 604, thereby causing engagement element 602 to engage.

Next, in step 657 the item is removed from the hanging/attachment element(s) (or just the tool if step 651 was omitted). Sometimes, depending upon the configuration of the tool (e.g., tool 500), because the bottom edge of the protruding portion 510 is at this point in contact with the top edge of the item, it will not be possible to simply lift the item off of the tool 500, as one ordinarily would do. Also, because the item might be large and heavy, in many cases it will be preferable to remove the tool 500 from the item (e.g., with the item resting on another surface). Therefore, in such cases, which preferably, the top edge of the item is first tilted forward, relative to the tool 500, thereby allowing it to clear the bottom edge of the protruding portion 510, and then the item either is lifted off the hanging/attachment element(s) or, more preferably, the tool 500 is slid downwardly and then separated from the item. In any event, once the item has been removed, with the upper section 504 fixed into position as a result of step 655 and, typically (although not necessarily) with the hanging/attachment element(s) still in place within the tool 500, the bottom edge of the protruding portion 510 represents where the top edge of the item would be if the item were to be suspended from such hanging/attachment element(s) at their position(s) within the tool 500.

Accordingly, in step 658 (after inserting the hanging/attachment element(s) into the tool, if not previously done so in step 651), the tool 500 is placed at the location at which the item is desired to be hung and, more specifically, such that the bottom edge of the protruding portion 510 is where the top edge of the item is desired to be. For this purpose, horizontal level 512 can be employed to help the user find an appropriate orientation (e.g., when the item has a straight top edge). It is noted that because the item is no longer suspended within the tool 500, unlike conventional tools, it often will be much easier to manipulate the tool 500 into different potential positions on the wall 560 (or other surface) in order to ultimately find the desired position for the item, and then to perform the other steps discussed below.

Figure 4:
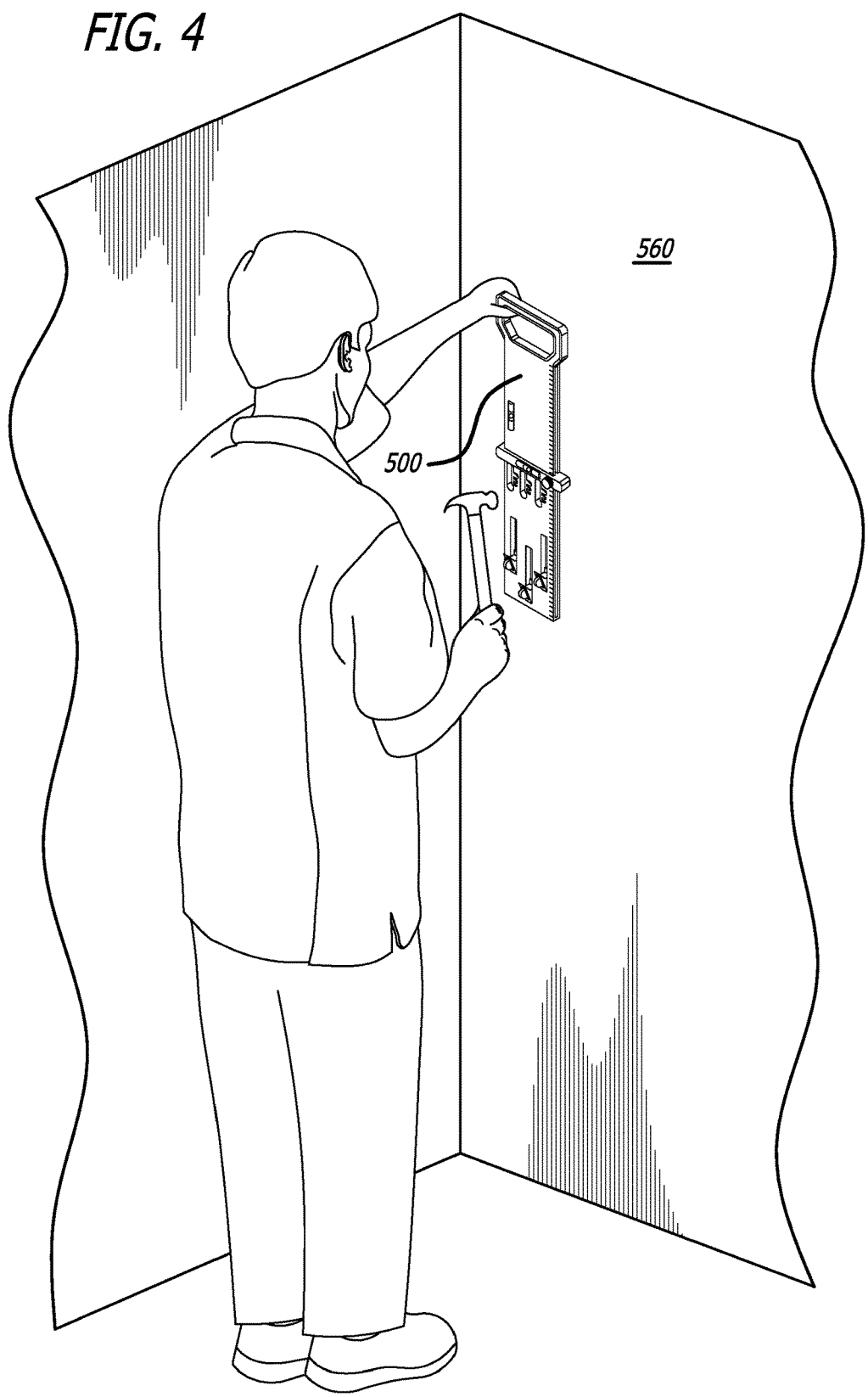
FIG. 4 is a perspective view of a user employing the tool to begin attaching a hanging/attachment element to a wall at a position appropriate to the desired location for the item to be hung.

Next, in step 660, with the tool 500 positioned at the location identified in step 658, the hanging/attachment element(s) are attached to the surface. FIG. 4 shows a user holding a tool 500 at the desired location and about to begin pounding in one or more nails within the tool 500. As indicated above, such hanging/attachment element(s) often will already be disposed within the tool 500. If not, it/they are reinserted and then attached in this step 660. In some cases, the attachment in this step 660 will involve just starting a nail or screw into the wall 560 (or other surface), i.e., inserting it/them partially into such surface. In others, the nail or screw will be inserted all (or almost all) of the way into the wall 560 (e.g., using the thickness of the tool 500 to provide the desired amount of extension for a simple screw or a simple nail 555. If a screw is being used, it often will be desirable to first drill a hole to the surface, e.g., through the opening (such as one of openings 517-519) into which it is ultimately to be inserted or through the opening(s) in the picture hook 556 which is to be used.

Next, in step 661 the tool 500 is removed from the hanging/attachment element(s), which ordinarily is/are now at least partially inserted into the wall 560 (or other surface). For example, if one or more simple nails or screws is/are being used as the hanging/attachment element(s), the tool 500 is manipulated such that the shaft of the (or each) hanging/attachment element slides along its corresponding slot (e.g., one of slots 521-523) until the head of such nail or screw can pass through the vertically oriented opening 524, thereby allowing the tool 500 to be removed from such hanging/attachment element(s). On the other hand, if one or more picture-hanging hooks 556 had been used as the hanging/attachment element(s), it ordinarily will be desirable to tilt the top of the tool 500 forward and/or slide the tool 500 downwardly in order to allow the top edge of the corresponding opening (e.g., any of openings 534-536) to clear the top of the corresponding picture-hanging hook 556. In any event, once the bottom of the picture-hanging hook 556 clears the top edge of the backing section 541, the tool 500 typically can be simply pulled away from the hanging/attachment element(s).

If the hanging/attachment element(s) had only been started in step 660, then in step 663 it/they are more securely attached with the tool 500 removed. Typically, this will involve pounding a nail or screwing a screw further (e.g., the rest of the way) into the wall 560 or other surface.

Finally, in step 664, the item is hung from the hanging/attachment element(s). For this purpose, the item preferably is hung in the same manner that it was in step 652. Additionally, the user may rotate the tool 500 by 90° in order to use the main body section 502 as a straight edge and the level 513 to ensure that the item is not tilted.

It is noted that in the foregoing method 650, the item is removed from the tool 500 before identifying the desired position on the wall 560. However, in alternate methods the item remains on the tool 500 until the desired position is found, and only then is it removed (e.g., after marking a spot on the wall 560 to help the user relocate that position).

A tool 700 according to the present invention is illustrated in FIGS. 12-15. As shown, tool 700 has a continuous elongated central opening 735 that serves several functions (e.g., essentially is a combination of two openings that extend into each other). First, rather than sliding along slots (such as slots 552 discussed above) on the outer longitudinal edges of main body section 702, upper section 704 slides along slots 752 along the longitudinal edges of central opening 735. In the current embodiment, slots 752 are open when viewed from the rear side of the tool 700. However, in alternate embodiments, such slots 752 are closed on the rear side, e.g., by simply attaching a rear panel to tool 700. Tool 700 includes an engagement piece 750 (which is at least approximately rectangular in the current embodiment) that is wider than the opening 735 but slightly narrower than the distance between the outer edges of the slots 752 and connects to a front knob 708 through a shaft 709 that fits through opening 735.

In the current embodiment, shaft 709 has exterior threading that mates with female threading within a corresponding opening in engagement piece 750. As a result, by turning knob 708 in one direction (typically clockwise), engagement piece 750 is clamped against the main body section 702, thereby locking upper section 704 into its current position. On the other hand, by turning knob 708 in the opposite direction (typically counterclockwise), the clamp is loosened, thereby allowing upper section 704 to slide freely along the length of main body section 702 (subject to any provided friction, as discussed above). For that purpose, engagement piece 750 preferably has opposite parallel edges that engage with the slots 752, although it instead could use wheels, ball bearings or other mechanisms that permit it to slide within central opening 735. Also, in alternate embodiments, any other mechanism (such as any of the options discussed above) may be used for clamping or otherwise temporarily releasably locking upper section 704 into a desired position.

Also, in tool 700, each of the elongated openings 734-736 includes similar structure to that discussed above for seating a picture-hanging hook 556 (i.e., a short backing section 741, an upwardly angled front/bottom support 742, a horizontal shelf 743 and a magnet 744) at the bottom of such opening. However, in tool 700 each of the elongated openings 734-736 also includes horizontally (or sideways) extending slots 721 and 722, with each such slot 721 or 722 for seating an individual nail or screw, disposed above such hook-seating structure, with a magnet 730 adjacent to such slots 721 and 722 for holding the inserted nail or screw into position).

One of the main differences between the present embodiment of tool 700 and the preceding embodiments is that the slots 721 and 722 extend from the same opening (e.g., each of openings 734-736) as is used for the picture-hook-hanging structure. Doing so, among other benefits, allows the overall length of tool 700 to be shorter. Also, by extending the central opening 735 and using it also for engaging with the upper section 704 (such that the upper section 704 slides along it) allows the upper section 704 to descend all the way down to at the top of the two outside hooks (if inserted). In certain embodiments, a stop is included within central opening 735 to prevent the upper section 704 from descending into opening 737 (which is used to accept the hanging/attachment element). However, in the present embodiment, slots 752 simply terminate at the desired point 753. As a further alternative, in other embodiments, the upper portion of central opening 735 is completely separate from its lower portion (i.e., opening 737). Finally, it is noted that although the present embodiment of tool 700 only employs two horizontal (or otherwise sideways-extending, but not necessarily exactly horizontal) nail slots 721 and 722, alternate embodiments may employ one, three or any other number, e.g., to accommodate any desired number of different sized nails and/or screws.

Figure 17:
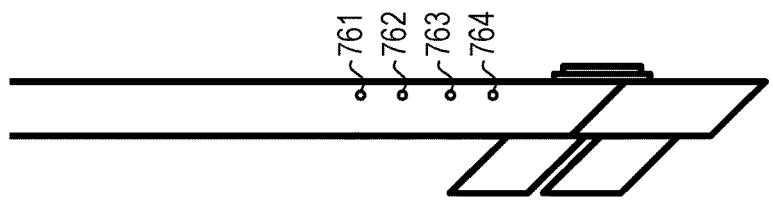
FIG. 17 is a left side elevational view of the bottom portion of the foregoing tool, with markings added.
Figure 16:
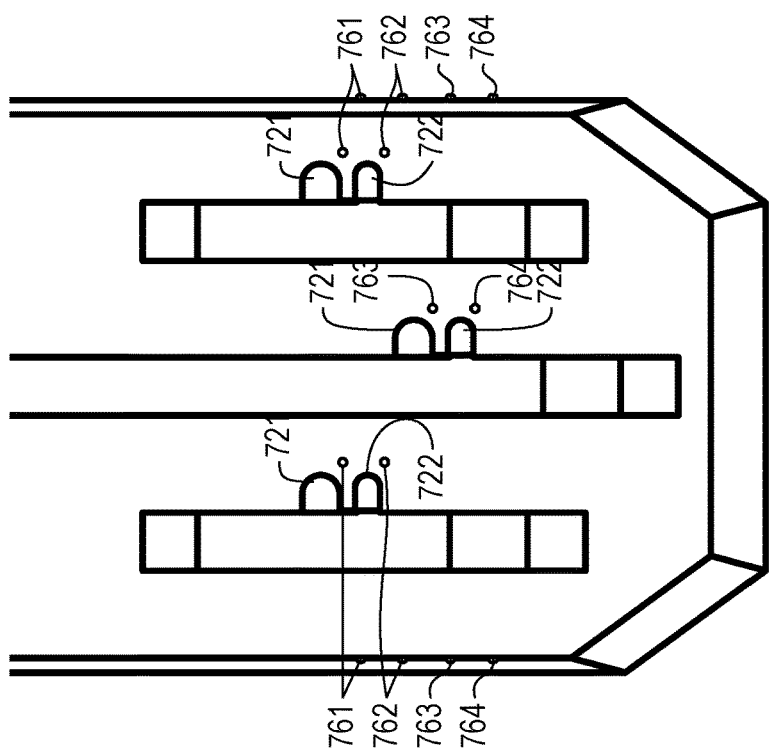
FIG. 16 is a front elevational view of the bottom portion of the foregoing tool, with markings added.

In the current embodiment, tool 700 preferably also includes a set of markings 761-764, e.g., as shown in FIGS. 16 and 17. According to the first variation of this embodiment, each of such markings 761-764 is provided at least once on the face of the tool 700 and also is provided on each side edge (which in the current embodiment is tapered from rear to front). More specifically, in the current embodiment each of the markings 761-764 on the front surface corresponds to the opening for an attachment element (e.g., a nail or screw), and the identical markings on the side edges denote the vertical position at which the attachment element would enter the wall or other surface. Because the attachment element slots are angled downwardly from the front surface to the rear surface of tool 700, the markings 761-764 on the side edges are below the respective markings 761-764 on the front surface.

With the use of markings 761-764, it is possible to identify the horizontal line at which one or more desired attachment devices will enter the wall or other surface. As a result, it can be possible to later move the attachment device(s) to a different position at the same height on the wall or other surface, or even to move the attachment device(s) further together or further apart (e.g., to accommodate the hanging of an object which has a fixed horizontal separation between where its attachment devices must be inserted).

With respect to the former, for example, the marking 763 on the front surface of the tool 700 designates the center wider/higher nail slot 721. Once the tool 700 has been used to identify the desired location for hanging the object (e.g., as discussed above), the user can simply insert an attachment device into the center slot 721 and, e.g., pound or screw it into the wall or other surface. Alternatively, the user instead might (e.g., using a pen, pencil or other type of marker) mark the wall at the two spots 763 indicated on the side of the tool 700. Then, the tool 700 can be turned 90° so that one of its side edges is used as a straight edge in order to find the line between the two spots that have just been marked on the wall or other surface. Inserting an attachment device at any position along this line will result in the object being hung at the desired height (once the object is placed on it).

With respect to the latter, for example, if the user wants or needs to employ two hanging/attachment devices, he or she can use the tool 700 to find the desired location for the object (e.g., as discussed above) and then can simply insert two attachment devices into the outer slots 722 (assuming a narrower attachment device is being used). Alternatively, the user instead might (e.g., using a pen, pencil or other type of marker) mark the wall at the two spots 762 indicated on the side of the tool 700. Then, the tool 700 can be turned 90° so that one of its side edges is used as a straight edge in order to find the line between the two spots that have just been marked on the wall or other surface. Inserting the two attachment devices at any positions along this line, but at the same relative separation, will result in the object being hung at the desired height (once the object is placed on it). If a different separation is desired, a height adjustment might need to be made (e.g., when hanging the object by a wire, string or other flexible line, although in such cases the amount of separation between the attachment devices typically is not critical and, therefore, a different separation than what is provided by the tool 700 typically will not be needed). If an adjustment is needed, it can be performed in a variety of different ways, such as by: (1) using just one of the slots 722 in step 651 of method 650, discussed above, and using a finger or other hanging point located at the desired separation distance in step 652 of that method 650; or (2) using an electronic adjustment calculator (e.g., optionally included within tool 700) which calculates the height adjustment based on simple geometric/trigonometric functions using the length of the line, the horizontal distance between its end points, and the two separation distances.

Each of the different corresponding marking sets 761-764 can be distinguished from the others in any of a variety of different ways, such as using different colors, different letters or other symbols, or in any other way. For example, all the markings 761 might be green, while all the markings 762 are blue, all the markings 763 are orange, and all the markings 764 are black.

Figure 18:
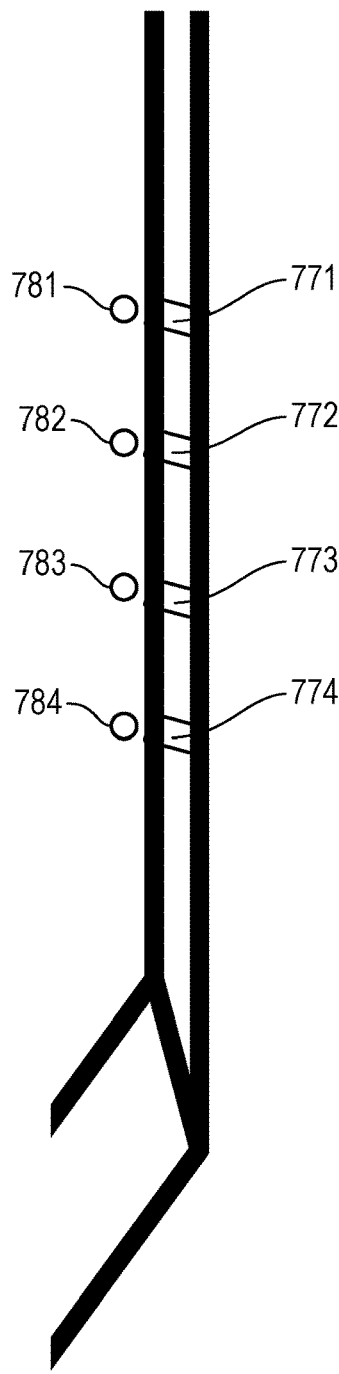
FIG. 18 is a perspective view of the bottom leftmost edge of the foregoing tool, with markings and channels or indentations added.
Figure 19:
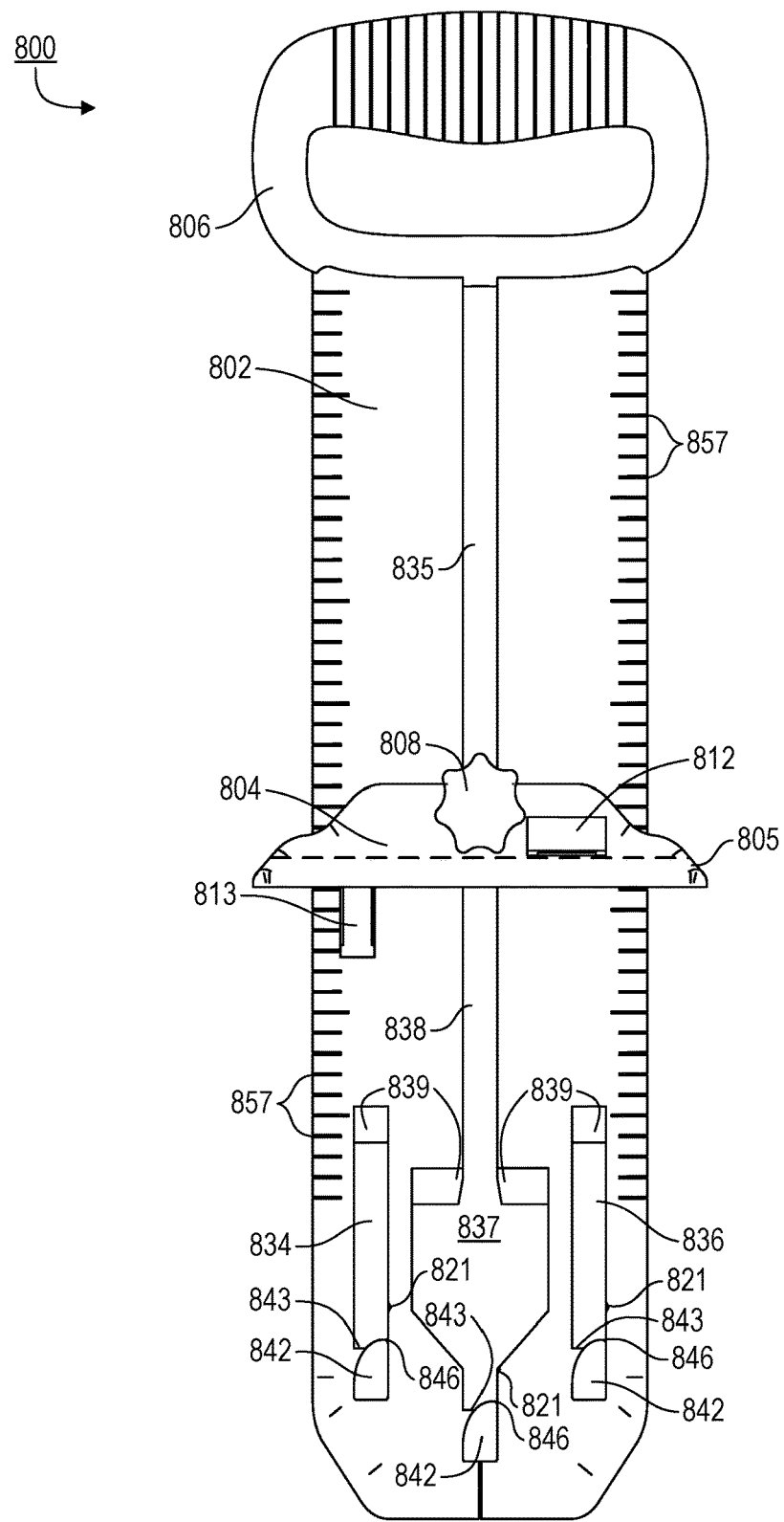
FIG. 19 is a front elevational view of a tool having, among other features, an enlarged central picture-hook opening and bottom supports with curved top edges.

In a second variation of this embodiment, the front markings 761-764 are the same as described above. However, as shown in FIG. 18, instead of including matching markings 761-764 on the side edges of the tool 700, the side edges include channels or indentations 771-774, respectively, and, optionally, the front surface, near such channels or indentations 771-774, includes markings 781-784, respectively. Preferably, markings 781-784 include identical identification information as markings 761-764, respectively (e.g., matching colors, letters or other symbols), on the front surface of the tool 700. Channels or indentations 771-774 preferably have a concave curvature, allowing a user to guide a pen, pencil or other marking device to the correct position on the wall or other surface. Although only one side is shown in the drawings, the opposite (right) side preferably is just the mirror image. According to this variation, the user still finds the pair of matching markings along the sides of the tool 700, although in this case, such markings (any one of 781-784) are on the front surface near the edge. However, rather than having to match the marking instrument (e.g., pen or pencil, or even a nail if the user wanted to make an indentation as the marking) to a visible mark, the user instead simply places the marking instrument in the channel (i.e., any one of channels 771-774) indicated by the matching marking (i.e., any one of markings 781-784, respectively) and then slides it along that channel until the marking is made on the wall or other surface.

When such channels or indentations 771-774 are used, the markings 781-784 can be placed in other locations, so long as the user is able to tell which corresponds to which channel, or they may be omitted entirely. In this case, the channels or indentations 771-774 themselves may be marked (e.g., with different colors, letters or other symbols) to match the markings 761-764, respectively, to which they pertain.

The foregoing markings and (if used) channels or indentations are described above primarily in reference to the nail slots. However, similar devices can be used for other kinds of hanging/attachment elements, although in such cases the provided markings and channels or indentations might need to be matched to the kind of hanging/attachment element that is intended to be used with it because such elements often provide their own attachment element insertion angles and distances.

As with certain previous embodiments, the present embodiment of tool 700 also includes a horizontally oriented level 712, a vertically oriented level 713 and a top handle 706. Although disclosed in particular positions, which currently are preferred for their ease of use, the levels 712 and 713 instead may be located at any other positions on tool 700. Pads 755 (e.g., extending slightly, such as 0.05-015. inch, or approximately 0.1 inch, from the rear plane of the tool 700 preferably are used in the rear surface of tool 700 to protect the wall or other surface on which the tool 700 is used. In this regard, tool 700 may be used in the same manner discussed above in connection with method 650.

In the foregoing specific embodiment, there is no need to reference a separate lower section because only the upper section 704 slides along the main body section 702. However, in alternate embodiments, a movable lower section that includes hanging/attachment element openings (e.g., openings 517-519 and/or openings 534-536) instead (or in addition, slides along the main body section 702. Also, whether or not movable, the lower portion of what is referred to above as main body section 702 (i.e., a portion including one or more of the hanging/attachment elements) may be referred to as a lower section.

A tool 800 that includes a main body section 802, a slidable upper section 804 and a top handle 806 is shown in FIGS. 19-22. In order to best accommodate various sizes of items to be hung while still being manageable by most people, tool 800 preferably is 12-18 inches long, 4-6 inches wide and 1-2 inches deep and, more preferably, approximately 15 inches long, 5 inches wide and 1.5 inches deep.

Except as otherwise discussed below, tool 800 and its various components (e.g., main body section 802, slidable upper section 804, top handle 806, front knob 808 and its corresponding threaded shaft 809, horizontally oriented level 812, vertically oriented level 813, nail or screw slots 821, magnets 830, elongated openings 834-836, upwardly angled support 842, horizontal shelf 843, engagement piece 850, slots 852 along the longitudinal edges of central opening 835, termination point 853 of the slots 852, and pads 855) preferably are similar or identical to, are subject to the same considerations and variations as, and provide the same advantages as, tool 700 and its various components (e.g., main body section 702, slidable upper section 704, top handle 706, front knob 708 and its corresponding threaded shaft 709, horizontally oriented level 712, vertically oriented level 713, nail or screw slots 721, magnets 730, elongated openings 734-736, upwardly angled support 742, horizontal shelf 743, engagement piece 750, slots 752 along the longitudinal edges of central opening 735, termination point 753 of the slots 752, and pads 755), respectively, as described above. Accordingly, the following discussion mainly focuses on the differences between tool 800 and tool 700. As noted elsewhere herein, the various features that are discussed herein generally may be combined in any desired manner, in order to achieve the corresponding desired features, and therefore, the particular embodiments described herein should be understood as merely exemplary, and/or in some cases, currently preferred.

In tool 800, the widest part (i.e., the upper part) of the center hook opening 837 (i.e., the lower portion of the central combined opening 835) is wider than corresponding opening 737 (in tool 700) and also has a tapered section near its bottom. As a result, opening 837 is able to accommodate hooks, such as the OOK™ brand Model #50616, which have a triangular-shaped top portion, e.g., with multiple nail openings. In the preferred embodiments, this widest part of opening 837 is at least 1 inch, and more preferably, approximately 1.5 inches, or at least 1.5 inches, wide. At the same time, the very bottom part of opening portion 837 is narrower (e.g., exactly or approximately as wide as openings 834 and 836, such as 0.25-0.50 inch wide, or more preferably, approximately 0.38 inch wide), e.g., for accommodating the more common types of picture-hanging hooks.

Figure 20:
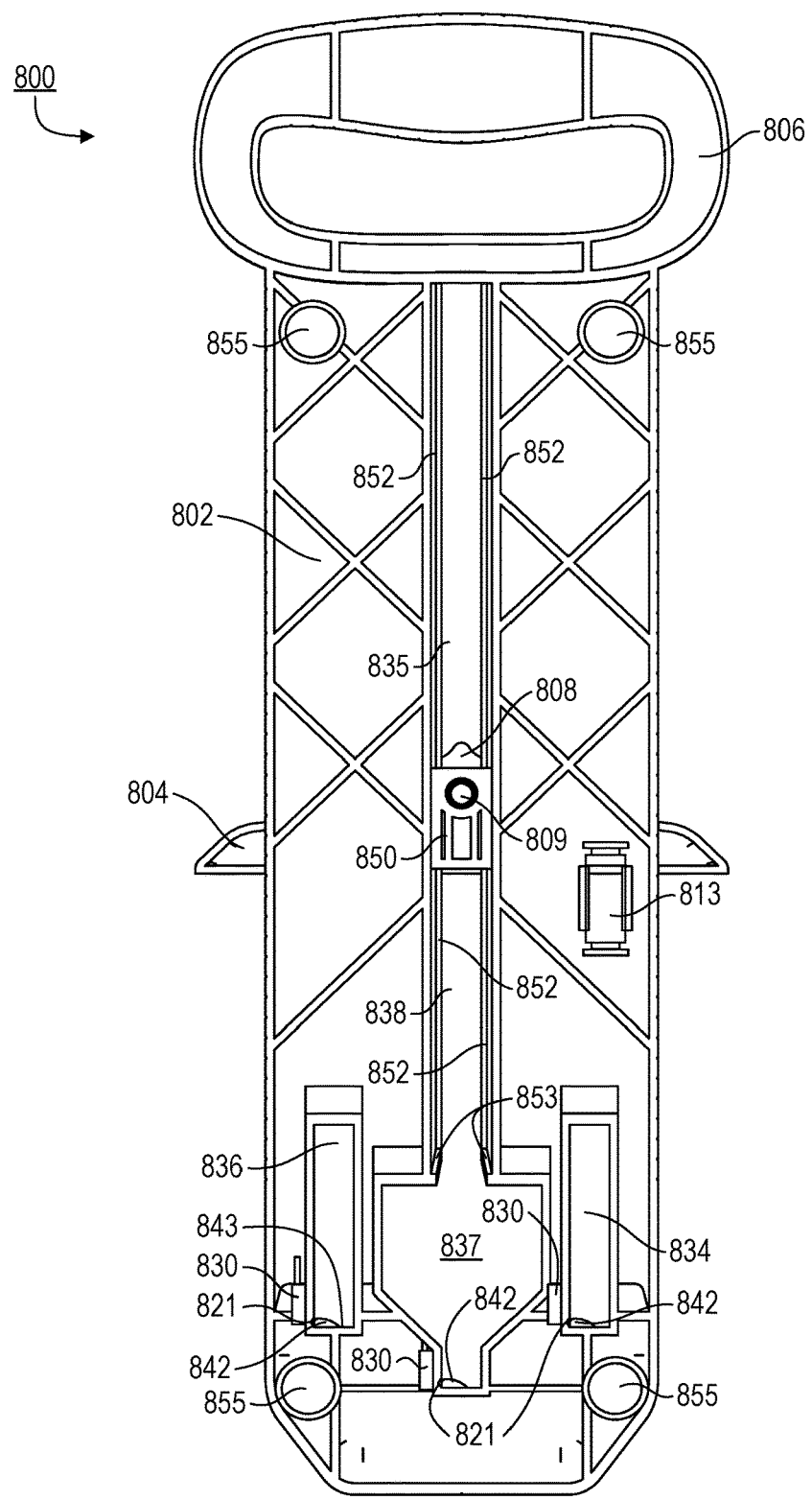
FIG. 20 is a rear elevational view of the foregoing tool.
Figure 21:
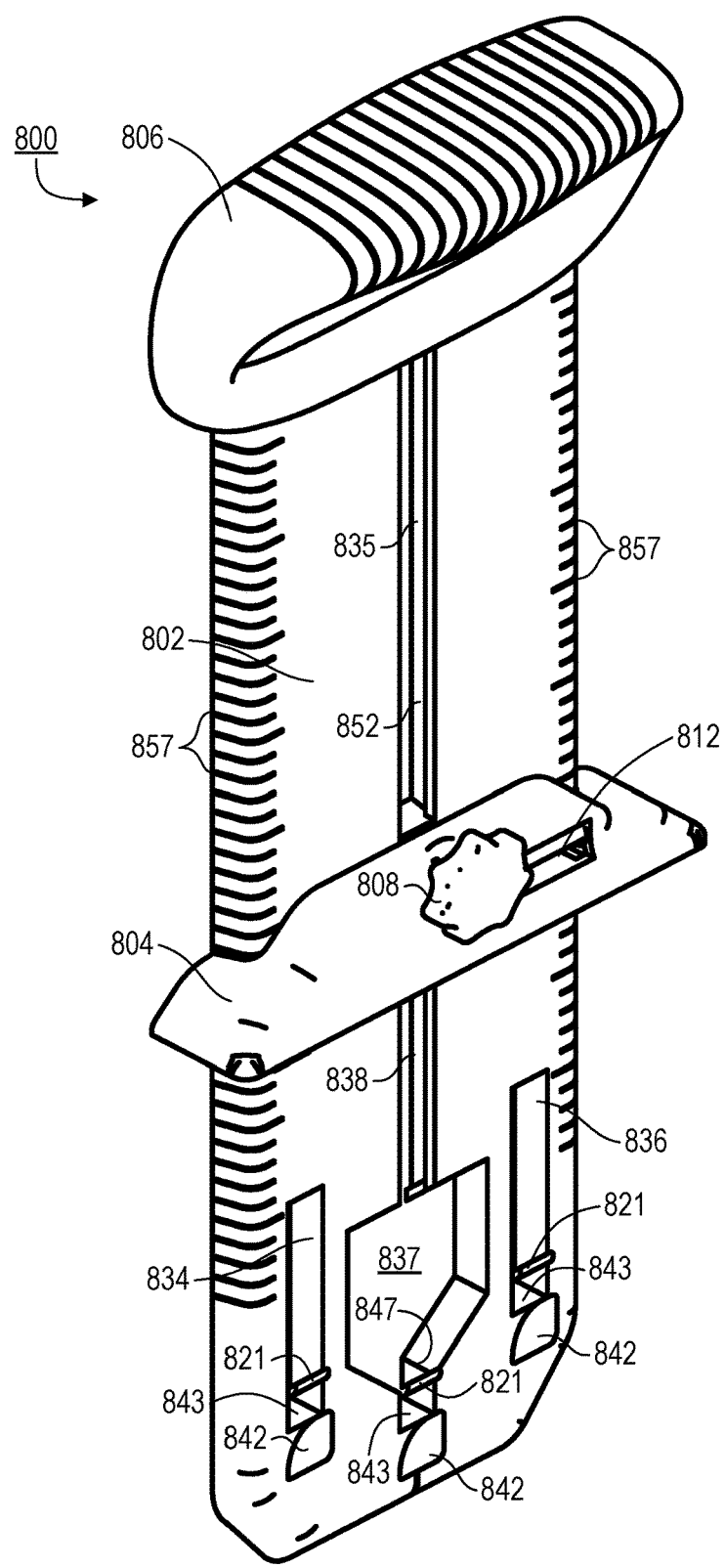
FIG. 21 is a top-right-side perspective view of the foregoing tool.

Also, in tool 800 there is no backing section (such as backing section 741 in tool 700). Instead, tool 800 mainly relies upon its magnet configuration and the upwardly angled support(s) 842 to hold the hook(s) in place. As to the former, a magnet 830 is disposed at the bottom left edge of each opening 834-836 (e.g., as shown in FIG. 20). As to the latter, in tool 800 each of the upwardly angled supports 842 has a curved or rounded top edge, with a high point disposed immediately adjacent to the magnet 830 for the corresponding opening 834-836. Preferably, the entire (or at least a significant part of the) top surface of the upwardly angled support 842 is angled upwardly away from the front surface 825 of the main body section 802 (e.g., as shown in FIG. 22), with the inner high point 845 approximately corresponding to the level of horizontal shelf 843 for the corresponding opening 834-836, and with the outer high point 846 elevated above that point. Such a configuration can, e.g., provide adequate support for a picture-hanging hook (or similar hanging/attachment element) while also allowing easier removal of such hanging/attachment element from the tool 800, and also can better serve to engage with a wire, notch or other structure on the item to be hung (e.g., by more specifically defining the point of contact) if the hanging/attachment element(s) are not inserted into the tool 800 in step 651 of method 650 (as discussed above).

As to this latter point, such a configuration of upwardly angled supports 842 can facilitate the adjustment of the tool 800 to the dimensions of the item to be hung without having to first place the hanging/attachment element(s) in the tool 800 (e.g., the performance of steps 652, 654, 655 and 657 in method 650 without any attachment element inserted into the tool 800 and, instead, the deferring of step 651 until after the performance of step 657). In such a case, the item's hanging wire, notch or other structure instead is engaged with the inner high point 845 or the outer high point 846 (preferably depending upon the nature of such hanging structure), e.g., in step 652. For example, if the item to be hung includes a hanging wire, such wire preferably engages with the inner high point 845. On the other hand, if the item to be hung includes a notch (typically for hanging the item on a screw or nail), then such a notch preferably engages with the outer high point 846.

Because the height of the engagement point differs depending upon whether inner high point 845 or outer high point 846 is used, an adjustment can be made in certain circumstances. For instance, in certain embodiments, the inner high point 845 corresponds fairly closely to the point where the (or each) hook, screw, nail or other hanging/attachment element will engage with the item when the item is hung using a hanging wire, cord or string. Therefore, when the inner high point 845 is used to adjust the tool 800 to the item (in steps 652, 654, 655 and 657 but without the hanging/attachment element(s) placed in tool 800), no adjustment generally will be needed.

On the other hand, if the item includes a notch (e.g., for hanging the item from a screw or nail), the outer high point 846 preferably is used to adjust the tool 800 to the item (in steps 652, 654, 655 and 657 but without the hanging/attachment element(s) placed into tool 800). In the present embodiment, the entry point of the nail/screw slot 821 on the front surface 825 of the main body section 802 is higher than the outer high point 846 (e.g., as shown most clearly in FIG. 19. As a result, without adjustment, a vertical positioning error in the amount of that height differential might occur in this circumstance. For this purpose, a provided (optional) easily attachable/detachable (e.g., snap-fit and/or slidably attachable/detachable) bottom strip 805 of slidable upper section 804, which is approximately equal in width to such height differential can be used. Then, e.g., the strip 805 can be attached while fitting the tool 800 to the item (e.g., in steps 652, 654, 655 and 657 but without the hanging/attachment element(s) placed into tool 800) and then detached prior to using the tool 800 to find the appropriate location(s) to insert the hanging/attachment element(s) (e.g., in step 658 of method 600). An alternate approach to address this problem, rather than using a detachable strip 805, is to make the outer high point 846 correspond to the same vertical position as the entry point of the nail/screw slot 821 on the front surface 825 of the main body section 802.

It is noted that nail/screw slots 821 (in tool 800) are narrower and shallower than corresponding slots 721 (in tool 700), and there is only one such slot 821 for each of the openings 834-836, rather than two. However, any number and any dimensions may be used in the various embodiments of the present invention.

FIG. 23 is a plan view of the left inner surface of the narrower bottom portion (up until the line 847 at which the slope of such surface changes from vertical to angled) of the central hook opening 837 (i.e., the bottom part of combined central opening 835) for tool 800. A similar configuration for the nail/screw slots 821 is present in the bottom portion of openings 834 and 836, although for openings 834 and 836, such surface is continuously vertical along its entire length in the present embodiment. As shown, each such nail/screw slot 821 is angled downwardly from the front surface 825 to the rear surface 826 of the main body section 802. In the current embodiment, the cross-sections of the nail/screw slots 821 are V-shaped, e.g., as shown in FIG. 24. However, in alternate embodiments nail/screw slots 821', having circular or rounded cross-sections (preferably having a large enough radius of curvature to accommodate the widest desired nail or screw), such as shown in FIG. 25, instead are used. In either event, because such slots (821 or 821') are immediately adjacent magnets 830, a screw or nail will be temporarily held in place when inserted into any one of them.

A final difference from tool 700 is the inclusion of front and side measurement markings 857 on tool 800. In the current embodiment, such markings 857 are designated by surface markings of a different color than the surrounding area of main body section 802, and also by very fine grooves. However, in alternate embodiments, such grooves are made wider (e.g., to facilitate marking with the pen or pencil at a desired position) or simply omitted. Also, in the current embodiment, adjacent markings 857 are 0.2 inch apart. However, any of the desired spacing instead may be used.

One similarity to tool 700 is that each of the openings 834, 836 and 837 in tool 800 has a top edge 839 that is angled upwardly from the rear side 826 to the front side 825 of the tool 800.

ADDITIONAL CONSIDERATIONS

As used herein, each use of the term "attached" or "connected", or any other form of either such word, without further modification, is intended to mean directly attached, attached through one or more other intermediate elements or components, or integrally formed together, in any manner. In the drawings and/or the discussion, where two individual components or elements are shown and/or discussed as being directly attached to each other, such attachments should be understood as being merely exemplary, and in alternate embodiments the attachment instead may include additional components or elements between such two components. Similarly, method steps discussed and/or claimed herein are not intended to be exclusive; rather, intermediate steps may be performed between any two steps expressly discussed or claimed herein.

Unless otherwise clearly stated herein, all relative directions (e.g., left, right, top, bottom, above, below) mentioned herein in relation to an article are from the perspective of the article itself and, therefore, are consistent across different views.

In the event of any conflict or inconsistency between the disclosure explicitly set forth herein (including the accompanying drawings), on the one hand, and any materials incorporated by reference herein, on the other, the present disclosure shall take precedence. In the event of any conflict or inconsistency between the disclosures of any applications or patents incorporated by reference herein, the disclosure most recently added or changed shall take precedence.

Unless clearly indicated to the contrary, words such as "optimal", "optimize", "maximize", "minimize", "best", as well as similar words and other words and suffixes denoting comparison, in the above discussion are not used in their absolute sense. Instead, such terms ordinarily are intended to be understood in light of any other potential constraints, such as user-specified constraints and objectives, as well as cost and processing or manufacturing constraints.

In the above discussion, certain methods are explained by breaking them down into steps listed in a particular order. However, it should be noted that in each such case, except to the extent clearly indicated to the contrary or mandated by practical considerations (such as where the results from one step are necessary to perform another), the indicated order is not critical but, instead, that the described steps can be reordered and/or two or more of such steps can be performed concurrently.

References herein to a "criterion", "multiple criteria", "condition", "conditions" or similar words which are intended to trigger, limit, filter or otherwise affect processing steps, other actions, the subjects of processing steps or actions, or any other activity or data, are intended to mean "one or more", irrespective of whether the singular or the plural form has been used. For instance, any criterion or condition can include any combination (e.g., Boolean combination) of actions, events and/or occurrences (i.e., a multipart criterion or condition).

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

In the discussions above, the words "include", "includes", "including", and all other forms of the word should not be understood as limiting, but rather any specific items following such words should be understood as being merely exemplary.

Several different embodiments of the present invention are described above and/or in any documents incorporated by reference herein, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the intent and the scope of the invention. Accordingly, the invention is not limited to the precise embodiments shown in the drawings and described above. Rather, it is intended that all such variations not departing from the intent of the invention are to be considered as within the scope thereof as limited solely by the claims appended hereto.

What is claimed is:

1. An apparatus for facilitating the hanging of an object on a wall or other surface, said apparatus comprising:
   a main body section having a front surface and an elongated first opening;
   an upper section connected to the main body section and having a protruding portion that protrudes away from the front surface;
   a lower section connected to the main body section and having a second opening for accepting, as well as a structure for holding, a hanging/attachment element; and
   a securing mechanism,
   wherein the upper section is slidably attached to the main body section via the elongated first opening and thereby capable of moving vertically up and down said main body section, but can be temporarily fixed at a desired position along the main body section by using said securing mechanism,
   wherein said lower section further comprises: (a) third and fourth openings, one on each side of said second opening, each for accepting an additional hanging/attachment element of the same type as said hanging/attachment element; and (b) second and third structures for holding said additional hanging/attachment elements,
   wherein said structure and each of said second and third structures is adapted to hold two different kinds of hanging/attachment elements, and
   wherein said structure, and each of said second and third structures, includes: (a) a slot formed into a sidewall of a corresponding one of the second, third or fourth opening; and (b) an upwardly angled support.

2. An apparatus for facilitating the hanging of an object on a wall or other surface, said apparatus comprising:
   a main body section having a front surface and an elongated first opening;
   an upper section connected to the main body section and having a protruding portion that protrudes away from the front surface;
   a lower section connected to the main body section and having a second opening for accepting, as well as a structure for holding, a hanging/attachment element; and
   a securing mechanism,
   wherein the upper section is slidably attached to the main body section via the elongated first opening and thereby capable of moving vertically up and down said main body section, but can be temporarily fixed at a desired position along the main body section by using said securing mechanism, and
   wherein the structure includes a slot formed into a sidewall of the second opening.

3. An apparatus according to claim 2, wherein said slot is angled downwardly from front to rear.

4. An apparatus for facilitating the hanging of an object on a wall or other surface, said apparatus comprising:
   a main body section having a front surface and an elongated first opening;
   an upper section connected to the main body section and having a protruding portion that protrudes away from the front surface;
   a lower section connected to the main body section and having a second opening for accepting, as well as a structure for holding, a hanging/attachment element; and
   a securing mechanism,
   wherein the upper section is slidably attached to the main body section via the elongated first opening and thereby capable of moving vertically up and down said main body section, but can be temporarily fixed at a desired position along the main body section by using said securing mechanism,
   wherein the securing mechanism comprises a first component having female threads and a second component having mating male threads engaged with the female threads of the first component, and
   wherein said elongated first opening includes a slot along each edge, and wherein said first component comprises an engagement piece that engages with each said slot.

5. An apparatus for facilitating the hanging of an object on a wall or other surface, said apparatus comprising:
   a main body section having a front surface and an elongated first opening;
   an upper section connected to the main body section and having a protruding portion that protrudes away from the front surface;
   a lower section connected to the main body section and having a second opening for accepting, as well as a structure for holding, a hanging/attachment element; and
   a securing mechanism,
   wherein the upper section is slidably attached to the main body section via the elongated first opening and thereby capable of moving vertically up and down said main body section, but can be temporarily fixed at a desired position along the main body section by using said securing mechanism, and
   wherein the securing mechanism: (a) is included within said slidable section; and (b) includes an engagement element that can be biased toward the main body section for temporarily fixing said slidable section at said arbitrary position along the main body section, but also can be retracted for permitting said slidable section to slide.

6. An apparatus for facilitating the hanging of an object on a wall or other surface, said apparatus comprising:
   a main body section having a front surface and an elongated first opening;
   an upper section connected to the main body section and having a protruding portion that protrudes away from the front surface;
   a lower section connected to the main body section and having a second opening for accepting, as well as a structure for holding, a hanging/attachment element; and
   a securing mechanism,
   wherein the upper section is slidably attached to the main body section via the elongated first opening and thereby capable of moving vertically up and down said main body section, but can be temporarily fixed at a desired position along the main body section by using said securing mechanism, and
   wherein said structure comprises a magnet disposed adjacent the second opening.

7. An apparatus according to claim 6, wherein the structure further includes an upwardly angled support.

8. An apparatus according to claim 6, wherein said lower section further comprises: (a) third and fourth openings, one on each side of said second opening, each for accepting an additional hanging/attachment element of the same type as said hanging/attachment element; and (b) second and third structures for holding said additional hanging/attachment elements.

9. An apparatus according to claim 8, wherein said structure and each of said second and third structures is adapted to hold two different kinds of hanging/attachment elements.

10. An apparatus according to claim 6, wherein the protruding portion of the upper section has a substantially straight bottom edge that is oriented substantially perpendicular to a vertical direction in which said upper section slides relative to the main body section.

11. An apparatus according to claim 6, wherein the main body section includes markings to indicate distance.

12. An apparatus according to claim 6, wherein the securing mechanism comprises a first component having female threads and a second component having mating male threads engaged with the female threads of the first component.

13. An apparatus according to claim 6, wherein the elongated first opening and the second opening extend into each other, forming a single continuous opening.

14. An apparatus according to claim 6, further comprising at least one level for identifying a line perpendicular to gravitational pull.

15. An apparatus according to claim 6, further comprising a handle, disposed above the upper section and fixedly connected to the main body section.

16. An apparatus according to claim 6, wherein sufficient friction exists between the upper section and the main body section so that the upper section only slides with application of force.

17. An apparatus for facilitating the hanging of an object on a wall or other surface, said apparatus comprising:
   a main body section having a front surface and an elongated first opening;
   an upper section connected to the main body section and having a protruding portion that protrudes away from the front surface;
   a lower section connected to the main body section and having a second opening for accepting, as well as a structure for holding, a hanging/attachment element; and
   a securing mechanism,
   wherein the upper section is slidably attached to the main body section via the elongated first opening and thereby capable of moving vertically up and down said main body section, but can be temporarily fixed at a desired position along the main body section by using said securing mechanism,
   wherein the structure further includes an upwardly angled support, and
   wherein said upwardly angled support has a top edge that curves downwardly from a high point disposed near an edge of the second opening.

18. An apparatus according to claim 17, wherein said high point comprises an inner high point and an outer high point which is vertically higher than the inner high point as a result of said upward angle, and wherein the inner high point is at approximately a same vertical level as a bottom edge of said second opening.

* * * * *